United States Patent
Meissner et al.

[15] 3,643,717
[45] Feb. 22, 1972

[54] APPARATUS FOR HANDLING, ORIENTING AND PITTING DRUPE HALVES

[72] Inventors: Konrad E. Meissner, Lafayette; Etheridge R. McClelland, Hayward; George E. Kilner, Alameda, all of Calif.

[73] Assignee: Filper Corporation, San Ramon, Calif.

[22] Filed: Dec. 21, 1970

[21] Appl. No.: 99,928

Related U.S. Application Data

[62] Division of Ser. No. 814,118, Apr. 7, 1969, Pat. No. 3,583,456.

[52] U.S. Cl. ....................................................146/28 A
[51] Int. Cl. ..........................................................A23n 3/08
[58] Field of Search ........................146/28 R, 28 A, 237, 238

[56] References Cited

UNITED STATES PATENTS 3,520,341    7/1970    Perrelli...........................146/28 R X

FOREIGN PATENTS OR APPLICATIONS 112,506    2/1941    Australia............................146/28 A

*Primary Examiner*—Willie G. Abercrombie
*Attorney*—Boyken, Mohler, Foster & Schwab

[57] ABSTRACT

A pitter for removing pits from clingstone peaches and the like, in which conveyor and orienting means is provided for delivering a plurality of drupe halves having pits or pit halves therein to pit removing devices that operate in synchronism with the delivery of said halves thereto for removing said pits from said halves, and which orienting and conveyor means automatically adjusts the positions of the drupe halves for pitting and the conveyor means holds them for resisting rotation while applying a rotary force to the pits relative to said halves to remove said pits.

14 Claims, 26 Drawing Figures

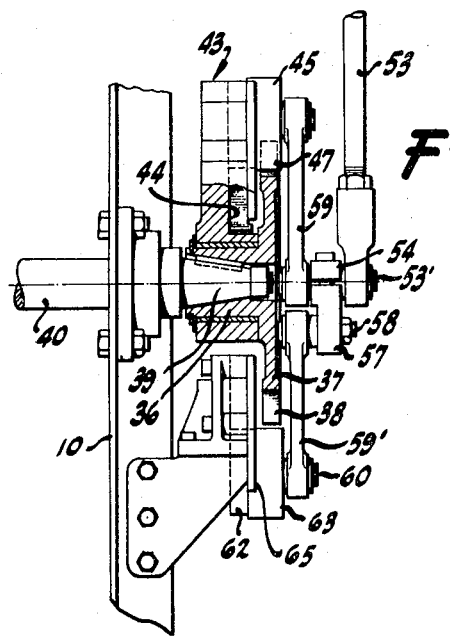

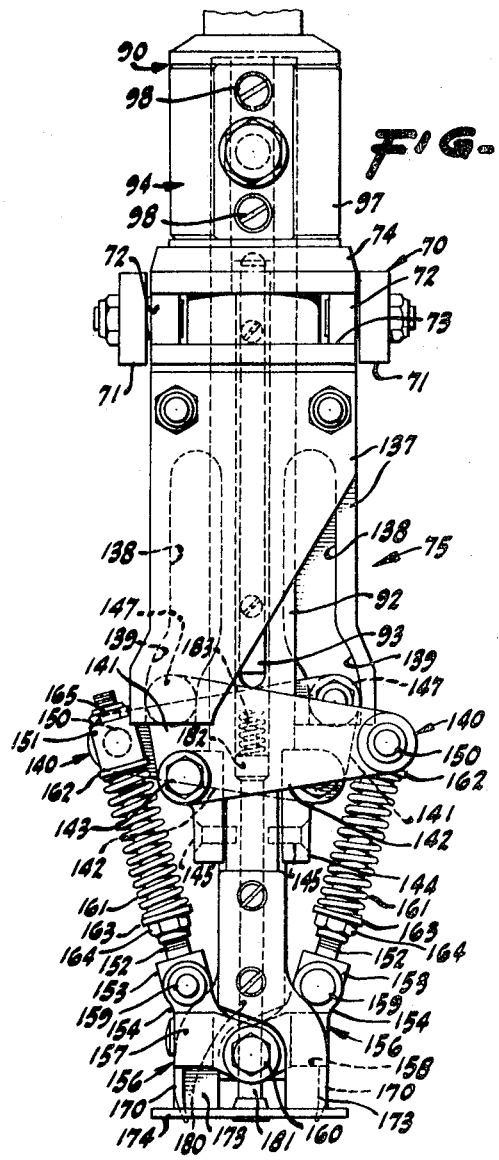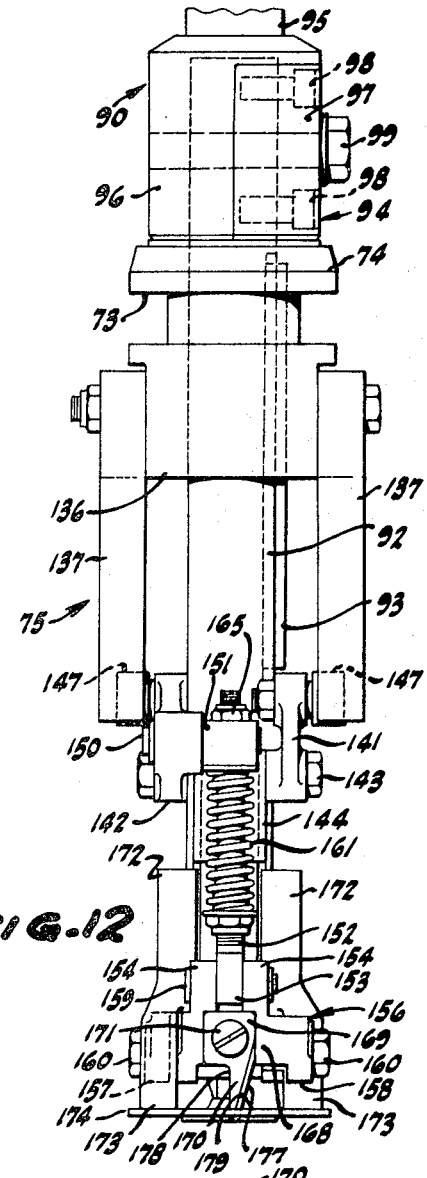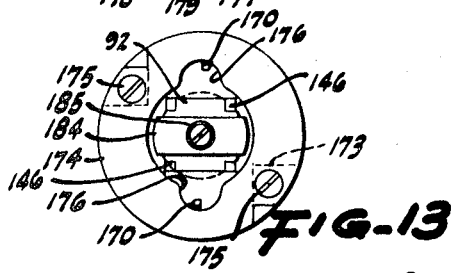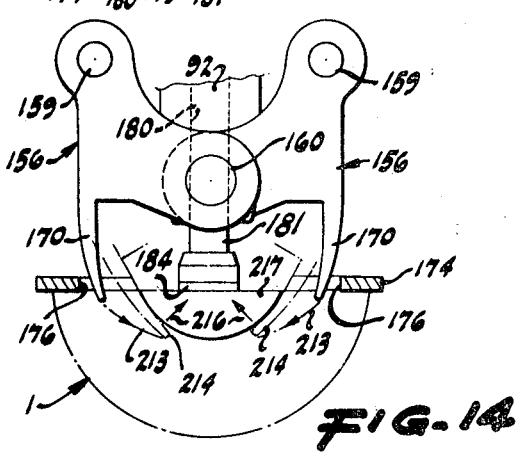
FIG-11
FIG-12
FIG-13
FIG-14
INVENTORS
KONRAD E. MEISSNER
ETHERIDGE R. MCCLELLAND
GEORGE E. KILNER
ATTORNEYS

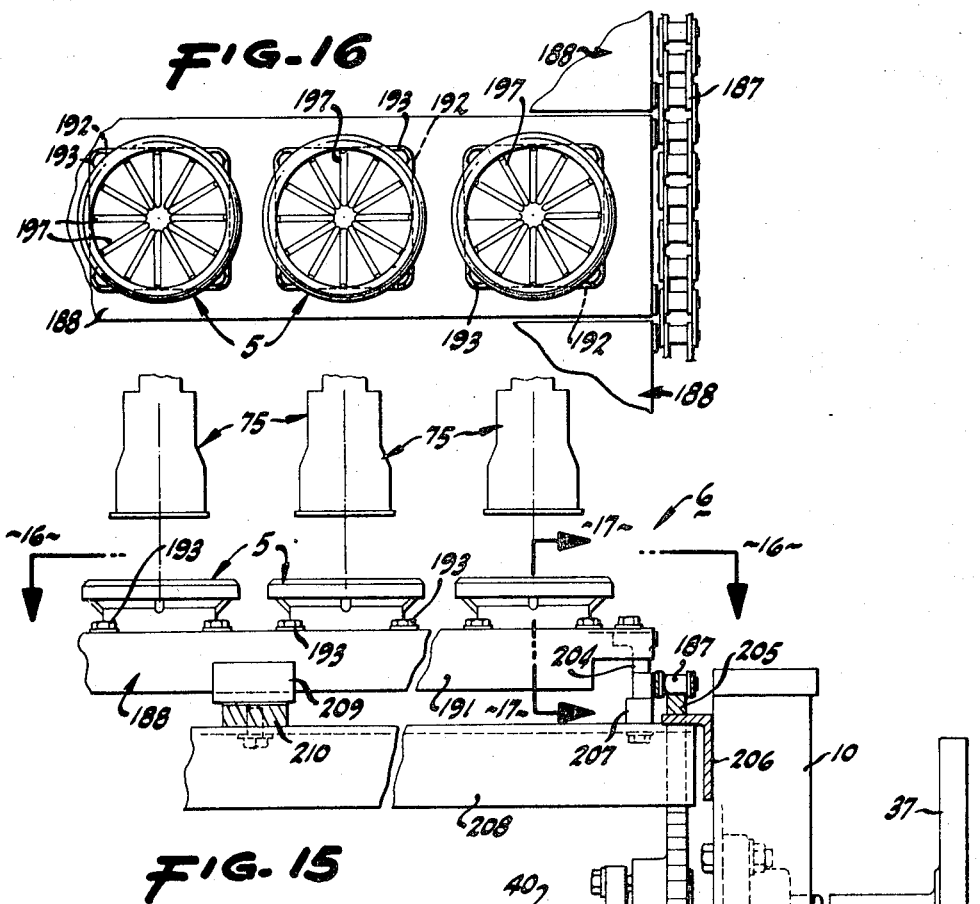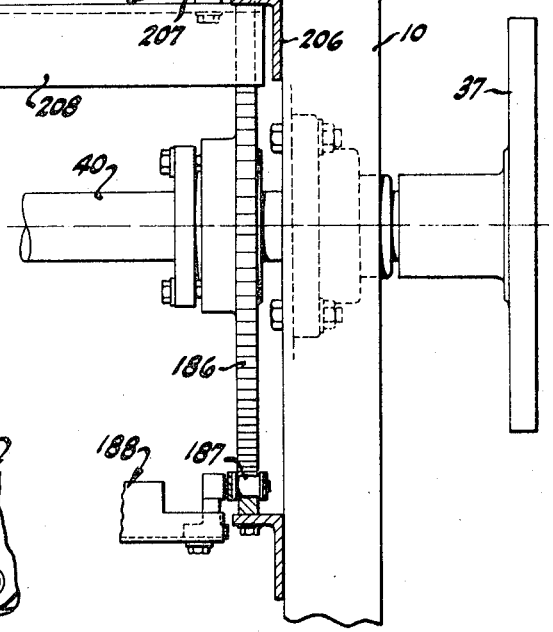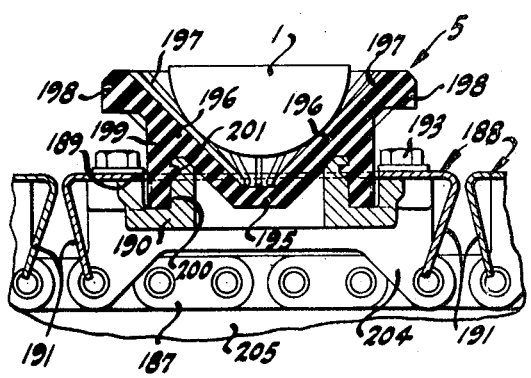

INVENTORS
KONRAD E. MEISSNER
ETHERIDGE R. McCLELLAND
GEORGE E. KILNER

ATTORNEYS

INVENTORS
KONRAD E. MEISSNER
ETHERIDGE R. McCLELLAND
GEORGE E. KILNER

ATTORNEYS

APPARATUS FOR HANDLING, ORIENTING AND PITTING DRUPE HALVES

This is a division of application Ser. No. 814,118 filed Apr. 7, 1969, now U.S. Pat. No. 3,583,456.

One of the objects of the present invention is the provision of apparatus for automatically handling, orienting, and pitting drupe halves from the time such drupe halves indiscriminately positioned relative to each other in a bulk mass are initially automatically carried from said mass to a pitting station, automatically oriented during movement to said station to position these pits in the same position for pitting at a pitting station and automatically pitting said halves at said station and thereafter disecting the pitted halves for further processing.

Heretofore it has been common practice to manually position whole drupes on individual feed means in a uniform position with respect to their sutures, for splitting or sawing the drupes, including their pits, into halves, after which the halves with the pit halves therein are automatically carried to and past pitting knives for cutting the pit halves free from the flesh of the drupe halves. The drupes are carried through such machines in succession, one at a time, and each machine is complicated and expensive both as to cost of manufacture and maintenance, and there is considerable waste of flesh due to the varying amounts of flesh that remains on the pits after cutting the pits loose.

In later developments, whole drupes are fed into a machine with their sutures uniformly oriented in one plane, and the drupes are bisected in the plane of their sutures, and the separation of the whole pits from the drupe bodies by twisting the halves about an axis perpendicular to said plane is accomplished almost simultaneously with the bisecting step. Pitters of this type have been known as "torque" pitters.

The halves of the bodies of drupes pitted by the torque-type pitters are sheared form the pits at the outer surfaces of the pits; hence, there is no loss of flesh in the pitting process whether the pits are large or small, but as the pits are held by the bisecting elements substantially in the plane of the suture of each drupe, while the halves are twisted relative to the pits, the pit halves will rotate with the body halves in the event the pits are split. Such split pits happen where certain abnormal seasonal conditions occur, and is usually attributed to abnormally fast development of the drupes when the fruit is forming.

The present apparatus is adapted to be employed as an auxiliary to torque-type pitters to pit the drupe halves that may not be pitted by the torque-type pitters due to split pits, in which case it may be called a repitter, or all of the drupes including their pits may be bisected and then pitted by the apparatus, and in a single pitting machine there may be any number of simultaneously actuated pitting units, each adapted to separate a whole or half pit from the pit cavity without loss of flesh irrespective of differences in the sizes of the pits so that the pitted products are substantially indistinguishable from those pitted by the true torque method.

As drupes including their pits may be bisected at a much higher rate than they can be pitted, it is seen that where a pitting machine is adapted to simultaneously pit to a plurality of drupe halves, such as eight or more, and which halves are automatically oriented and fed to the pitting unit at approximately the same rate as they are singly fed to conventional pitters for pitting single peaches, the volume of drupes pitted is materially increased over the ordinary systems heretofore used, and the drupe halves have all the desirable characteristics of halves pitted by the strictly torque-type pitter.

Other objects and advantages will appear in the detailed description and drawings.

BRIEF DESCRIPTION OF THE DRAWINGS

FIG. 4 is a fragmentary elevational view, partly broken away and in cross section, of a part of FIG. 3 as seen substantially from line 4—4 of FIG. 3.

FIG. 5 is a fragmentary top plan view of the portion shown in FIG. 4 so seen from line 5—5 of FIG. 3.

FIG. 6 is a sectional development taken substantially along line 6—6 of FIG. 3.

FIG. 7 s an elevational view of portion of the device shown in FIG. 3 as seen from line 7—7 of FIG. 3, but with a position broken away for clarity.

FIG. 11 is an enlarged, side elevational view of one of the pitting heads of the apparatus, the outline of one of which is indicated in full and broken lines in FIG. 8.

FIG. 12 is a side elevational view of the pitting head of the FIG. 11, as seen at a right angle to the latter.

FIG. 13 is a bottom plan view of the pitting head of FIG. 12.

FIG. 14 is a fragmentary enlarged elevational view of the lower end of the pitting head of FIG. 11 showing, in dot-dash lines, the action of the pit-engaging tines in a pitting operation and the forces applied to the pit being shown by arrows.

FIG. 15 is an enlarged, fragmentary, part sectional, part elevational view of a part of the cup-type conveyor shown in FIG. 1, taken along line 15—15 of FIG. 1, including the indexing disc secured to a conveyor shaft separate from the indexing device, and also showing the lower portion of several pitter heads above the conveyor cups.

FIG. 16 is a fragmentary top plan view of one of the conveyor cups as seen from line 16—16 of FIG. 15.

FIG. 17 is a cross-sectional view of one of the cups of the transverse rows thereof taken along line 17—17 of FIG. 15.

SYSTEM GENERALLY

Figure 1:
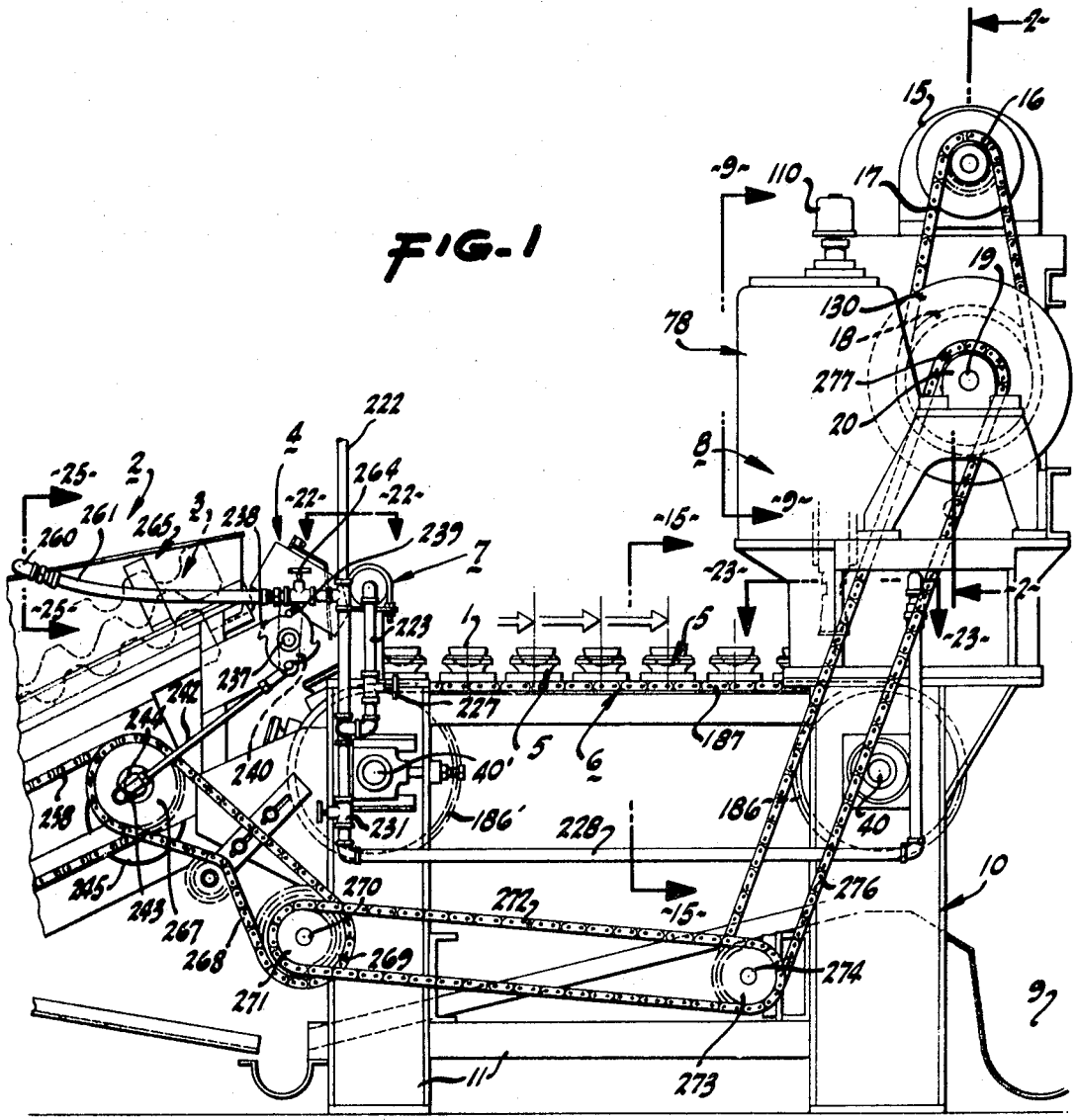
FIG. 1 is a side elevational view of the apparatus, generally, with certain parts simplified, omitted and broken away, for clarity.

Referring to FIG. !, bisected drupe halves 1 that have full or half pits therein are fed in indiscriminate arrangement relative to each other from any feed device such as a conventional merry-go-round, into a hopper generally designated 2 and onto the lower end of a conventional upwardly inclined feeder generally designated 3, or specific feeder such as disclosed in copending application Ser. No. 779,584, filed Nov. 27, 1968, now U.S. Letters Pat. 3,547,249, issued Dec. 15, 1970, for delivery, one at a time, from the upper end of said feeder. In feeders of this type the drupe halves or objects being fed are arranged in a plurality of horizontally spaced rows, and the halves are simultaneously discharged from the upper ends of said rows, one at a time, from each row. In the system described hereinafter, there are eight rows, although there may be more. The halves so discharged may have their cut or planar surfaces directed face upwardly or face downwardly, the said "cut" faces being planar and opposite to the generally hemispherical surface, and the pit is in approximately the center of said planar surface.

A combined orienter and feeder, generally designated 4 of any suitable type, or as shown in copending application Ser. No. 813,955, filed Apr. 7, 1969, simultaneously receives the drupe halves so discharged from the upper end of feeder 3 and automatically delivers or dumps said halves with their cut faces directed upwardly into cups 5 of an endless conveyor generally designated 6, there being one drupe half for each cup; hence, cups 5 are preferably in a horizontal row with one row for the drupe halves of each row fed by feeder 3, and, as will later be described, the orienter and feeder 4 has a receiving unit for each drupe half.

Figure 22:
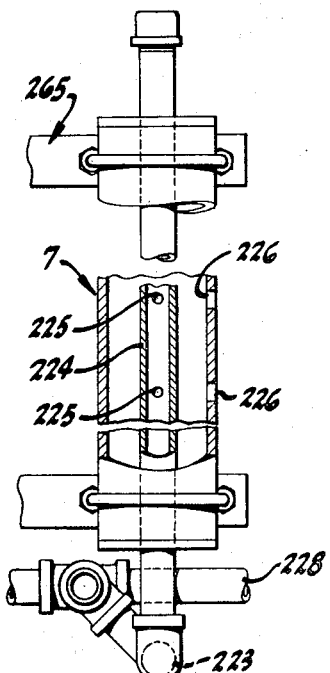
FIG. 22 is a fragmentary top plan view, partly in cross section, of a horizontally elongated manifold for feeding water to the cups of the cup conveyor as seen from line 22—22 of FIG. 1.
Figure 23:
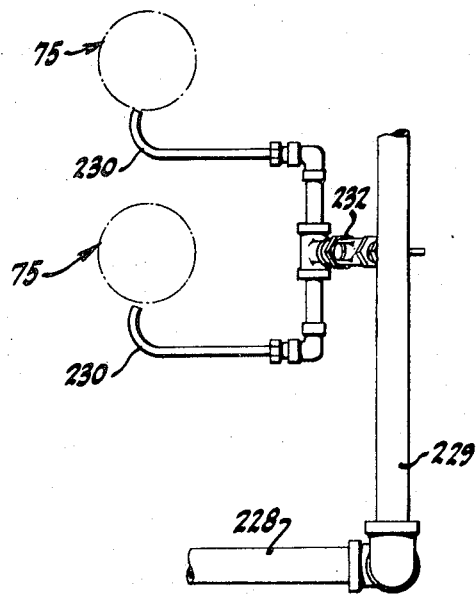
FIG. 23 is a fragmentary top plan view of a pair of nozzles as seen from line 23—23 of FIG. 1.
Figure 24:
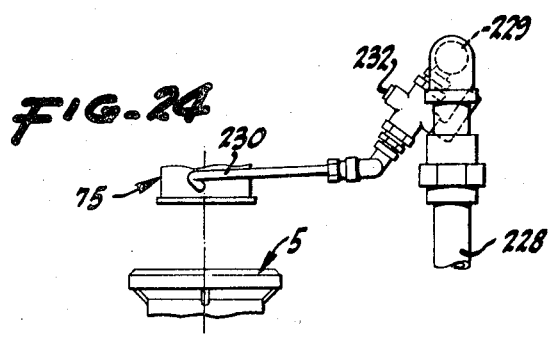
FIG. 24 is a fragmentary elevational view of one of the spray nozzles shown in FIG. 23 in relation to pitting head and the cup conveyor.

At the end of the conveyor 6 where the halves 1 are received, the discharge of water from an overhead manifold pipe 7 having an outlet over the cups at said end of conveyor 6, is adjusted to deposit water into each cup so that the drupe halves 1 adjusted to deposit water into each cup so that the drupe halves 1 may be semifloated in each cup (FIGS. 1, 22).

The purpose of this is to provide for automatic adjustment of each of the peach halves that might be slightly "cocked" to one side or the other relative to horizontal so that the upper cut surface of each drupe will be substantially level or horizontally by the time it reaches the pitter. The movement of the conveyor 6 is intermittent in a direction away from the orienter and feeder 4 so that a transversely extending row of cups will always be beneath the discharge end of the orienter and feeder 4 to receive the drupe discharge end of the orienter and feeder 4 to receive the drupe halves that are simultaneously discharged from the orienter and feeder 4. This intermittent movement, or the stopping of the cups after each movement may contribute to the automatic levelling of the upper cut faces of the semifloating drupe halves but in any event the amount of water deposited in each cup is adequate to preclude the halves from being frictionally held in a "cocked" position relative to horizontal by the time they reach the pitter.

Conveyor 6 delivers the drupe halves to below a row of drupe pitters generally designated 8, where drupe-pitting means are simultaneously actuated to engage the planar upper surfaces of the drupe halves that are in the cups below said pitters, for holding the bodies of the halves stationary, and to remove the pits from said halves, after which the cups may carry the pitted halves and pits to a discharge position for discharge onto a belt or into a flume, generally designated 9.

The mechanism for actuating the feeders 3, 4 and conveyor 6 and pitters 8 may be supported on a frame 10 that carries the pitters 8 and that may support one end of the conveyor 6. Extension 11 of said frame extends to the left as viewed in FIG. 1. The frame 10 supports the source of power for the conveyors and feeders.

CONVEYOR INDEXING MECHANISM

Figure 2:
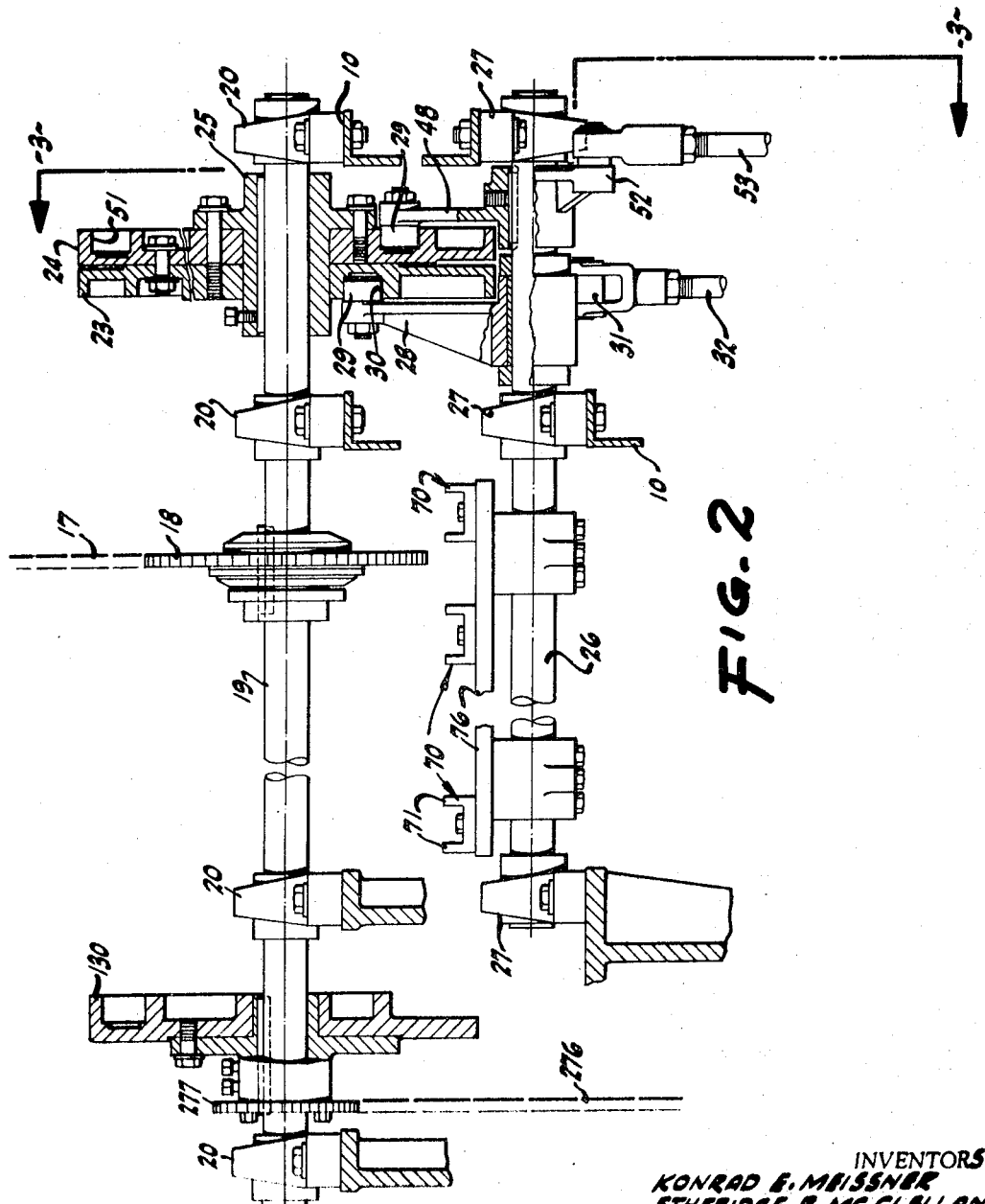
FIG. 2 is an enlarged, part sectional and part elevational view of working parts in the portion shown in FIG. 1 approximately along line 2—2 of FIG. 1.
Figure 3:
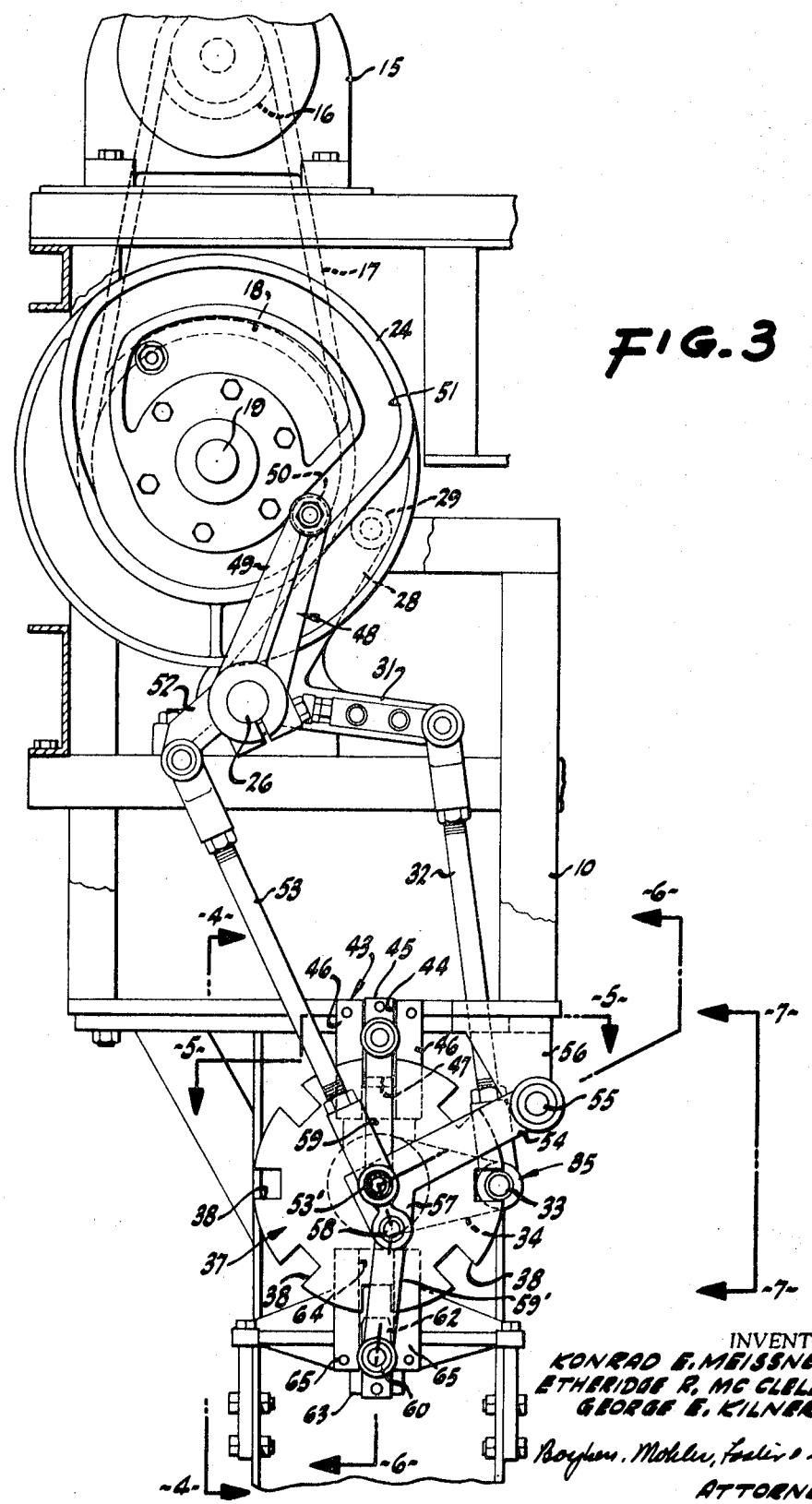
FIG. 3 is a part sectional, part elevational, fragmentary end view of the portion shown in FIG. 2 including an indexing mechanism positioned below the portion shown in FIG. 2, substantially along line 3—3 of FIG. 2.

Referring to FIG. 3, a driven shaft from a gearbox connected with motor 15 carries a sprocket wheel 16 that, in turn, is connected by a chain 17 with a sprocket wheel 18 on a camshaft 19. Camshaft 19 is supported for rotation in bearings 20 (FIG. 2), carried by frame 10, and a pair of face cams 23, 24 are secured together, back to back, on a sleeve 25 that, in turn, is keyed to said shaft 19.

A rocker shaft 26, (FIGS. 2, 3), parallel with and spaced below camshaft 19, is rotatably supported by bearings 27 (FIG. 2) on frame 10, (FIG. 3). One arm 28 (FIG. 3) of a bellcrank is keyed at one end to said rocker shaft, and the opposite end of arm 28 carries a cam follower 29 that is in the cam track 30 (FIG. 2) of cam 23. The other arm 31 of said bellcrank is pivotally connected to the upper end of a connecting rod 32 (FIG. 3). The other or lower end of connecting rod 32 is pivotally connected by a pivot 33 to the outer end of one arm 34 of a bellcrank generally designated 35 (FIG. 5), which crank is rotatably supported on a bearing on the hub 36 (FIG. 4) of a circular indexing plate or disc 37 (FIGS. 3, 4). Disc 37 is formed around its outer periphery with a plurality of radially outwardly opening, correspondingly shaped recesses 38 (FIG. 3). The hub of disc 37 is keyed onto the tapered extension 39 (FIG. 4) of shaft 40, the latter supporting one end of the endless conveyor 6.

The other arm of crank 35, generally designated 43 (FIGS. 3, 4), extends radially outwardly of the axis of shaft 39.

The arm 43 extends along one side of the disc 37 and its side facing said disc is formed with an elongated guideway 44 (FIG. 3) extending longitudinally of said arm in which is slidably positioned a slide 45 retained in said guideway by a pair of parallel spaced plates 46 (FIG. 5) that are parallel with said guideway. A lug 47 projects on slide 45 across the outer periphery of the disc 37. The lower portion of lug 47 is adapted to slide into and out of the recesses 38 in the outer periphery of disc 37 upon reciprocatory movement of the slide 45.

From the foregoing, it is seen that the disc 37 will be rotated counterclockwise, as seen in FIG. 1, to actuate conveyor 6 when the arm 34 of crank 35 is moved counterclockwise and when lug 47 is in one of the recesses 38 of the disc 37. The reciprocable movement of connecting rod 32 is controlled by cam 23 on camshaft 19.

A crank generally designated 48 (FIG. 3) is also secured on rocker shaft 26, one arm 49 of which carries a cam follower 50 on its outer end that is in engagement with and moved by the cam track 51 in face cam 24 upon rotation of said cam 24, the latter being on camshaft 19.

The other arm 52 of crank 48 is pivotally connected at its outer end with the upper end of a connecting rod 53. The lower end of rod 53 is pivotally connected with the outer end of an arm 54 (FIG. 5), the inner end of which is pivotally connected by a pivot 55 (FIG. 3) with a bracket 56 that is rigid on a portion of stationary frame 10. Said pivot 55 is radially outwardly of the outer periphery of disc 37 and the arm 54 extends at approximately a right angle to the connecting rod 53, while the outer end of arm 54 is approximately at the axis of shaft 40, a pivot 53' connecting the lower end of connecting rod 53 with the outer end of arm 54 (FIG. 3).

The pivot 53' also is connected with the lower end of a generally vertically extending link 59 that is pivotally connected at its upper end with the lug 47 on slide 45 (FIG. 4).

The outer end of arm 54 is offset downwardly at 57 (FIG. 3), and a pivot 58, carried by said offset portion, is connected with the upper end of a generally vertically extending link 59'. The lower end of link 59' is pivotally connected by a pivot 60 with a lug 62 on a radially extending slide 63 that is reciprocable radially of the axis of rotation of the indexing disc 37 in a stationary guideway 64. Lug 62 will be called a "locking lug" as distinguished from the upper lug 47, which may be called a "moving lug." Plates 65, corresponding to plates 46, except that plates 46 are movable with crank arm 43, hold the slide 63 in position, and said plates 65 and guideway 64 are rigidly secured to a stationary part of frame 10.

In FIG. 3, the upper moving lug 47 is shown in the upper recess 38 in the indexing disc 37, and the lower locking lug 62 is spaced slightly outwardly of the recess 38. Upon upward movement of the connecting rod 32 by its connection with cam 23, the indexing disc 37 will be rotated counterclockwise the distance determined by the contour of the cam track 30, for advancing the conveyor at predetermined intervals to bring a transverse row of cups below the pitting mechanism 8.

The movement of connecting rod 53 is in timed relation with movement of connecting rod 32. After each actuation of the indexing disc 37 under the influence of the movement of connecting rod 32, the connecting rod 53 is actuated by movement of cam 24 to move locking lug 62 into one of the recesses 38 and to withdraw the lug 47 on crank 43, thereby positively locking shaft 39 and conveyor 6 stationary, with one transverse row of the cups 5 below the pitters 8. As long as locking lug 62 is in one of the recesses 38 the indexing disc 37 is positively locked against movement in either direction and the period during which the shaft 39 and the indexing disc are held stationary depends upon the contour of cam track 51. During the period when the indexing disc 37 is locked, cam 23 will effect movement of the crank 35 through connecting rod 32 back to its normal position, as seen in full line in FIG. 4, preparatory to the next actuation of connecting rod 53 to withdraw the locking lug 62 and to move the moving lug 47 back into the position shown in FIG. 1 positioned in one of the recesses 38 for effecting another movement of the indexing disc 37 and shaft 39.

SUPPORT AND VERTICAL RECIPROCATION OF PITTING HEADS

Figure 8:
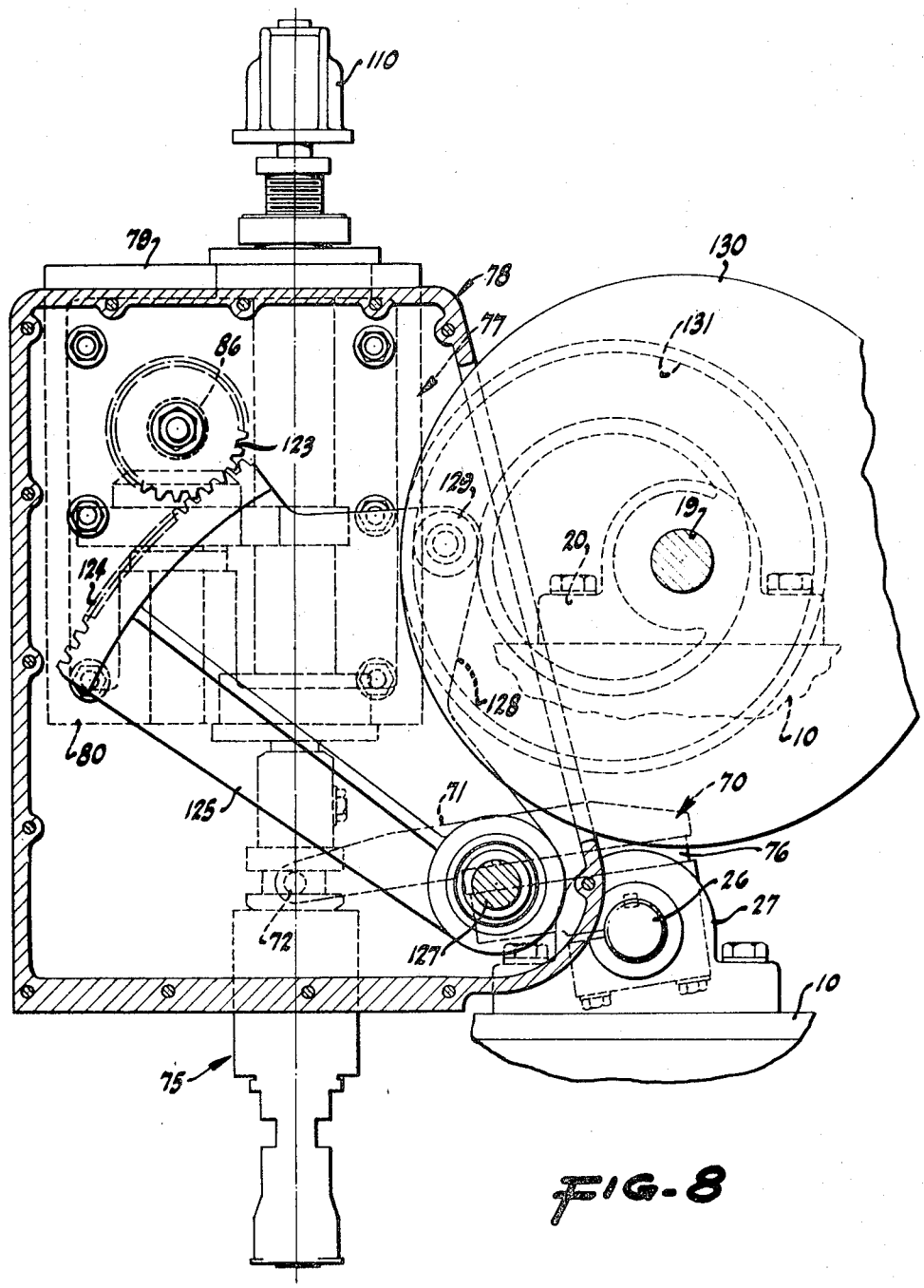
FIG. 8 is a sectional view taken along line 8—8 of FIG. 9.

Secured on rocker shaft 26 is one end of each of a plurality of corresponding arms 70 (FIGS. 2, 8). The opposite outer end of each arm is formed with a yoke to provide horizontally spaced arms 71 (FIGS. 8, 9, 10), each having a roller 72 thereon disposed on the opposedly facing sides thereof, which rollers are positioned in an annular outwardly opening recess 73 formed in collar 74 (FIGS. 9, 11, 12) of one of the pitting heads 75 of a pitting mechanism. A horizontally elongated metal strip 76 (FIGS. 2, 10) extends the length of the row of pitting heads, and longitudinally of the rocker shaft 26 and is clamped between the respective arms 70 on said shaft (FIG. 8), which strip automatically aligns the arms 70 longitudinally of the row thereof.

The rocking of rocker shaft 26 under the influence of cam 24 controls the oscillatory movement of the arms 70 and consequently the lowering and elevating of pitter heads 75, as will later be explained more in detail.

A detailed description of one pitting head and its support and actuating means will suffice for the others except that a single gear will actuate each separate pair of pitting heads.

Figure 9:
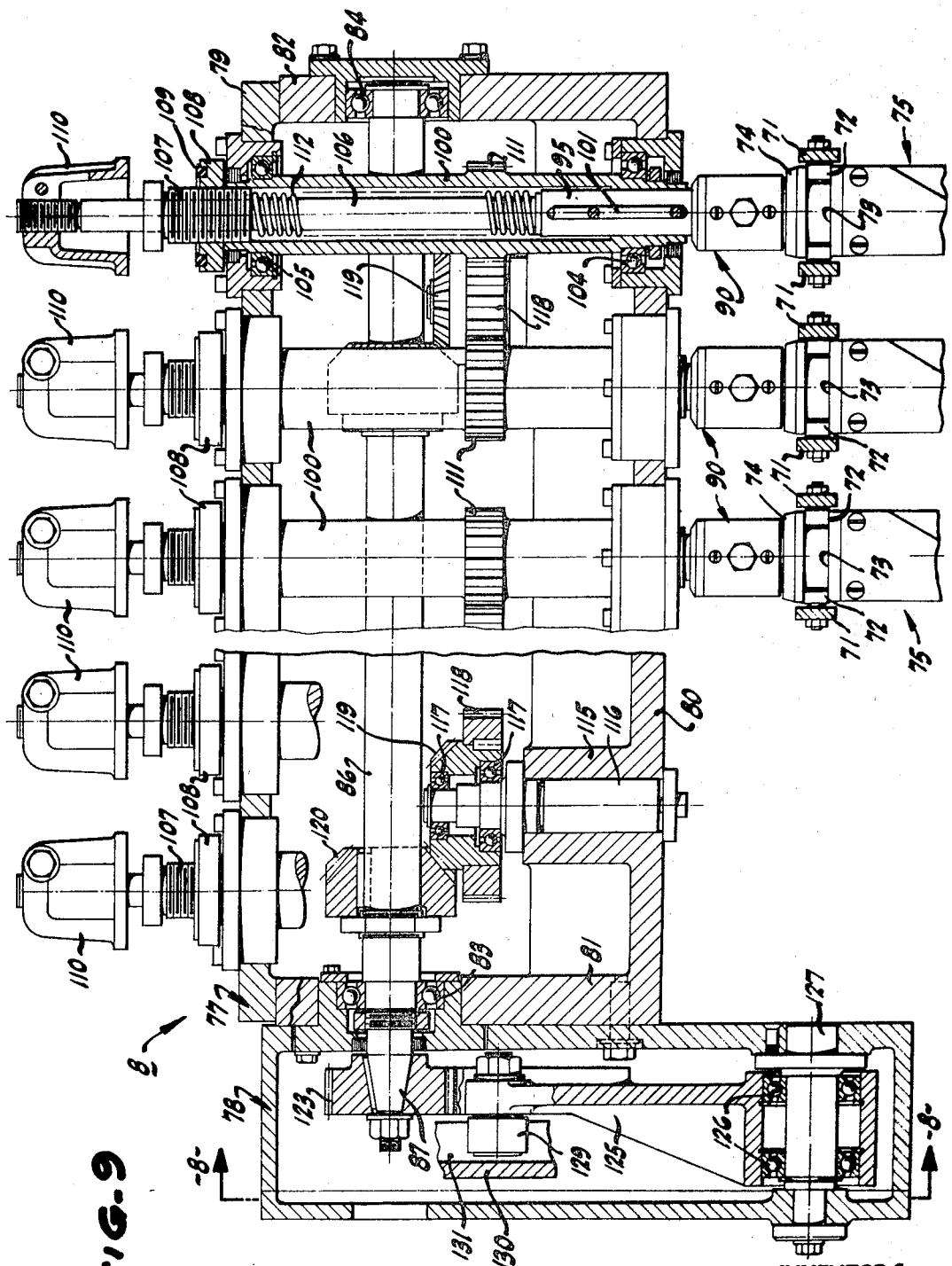
FIG. 9 is an enlarged part elevational, part sectional view taken generally along line 9—9 of FIG. 1.
Figure 10:
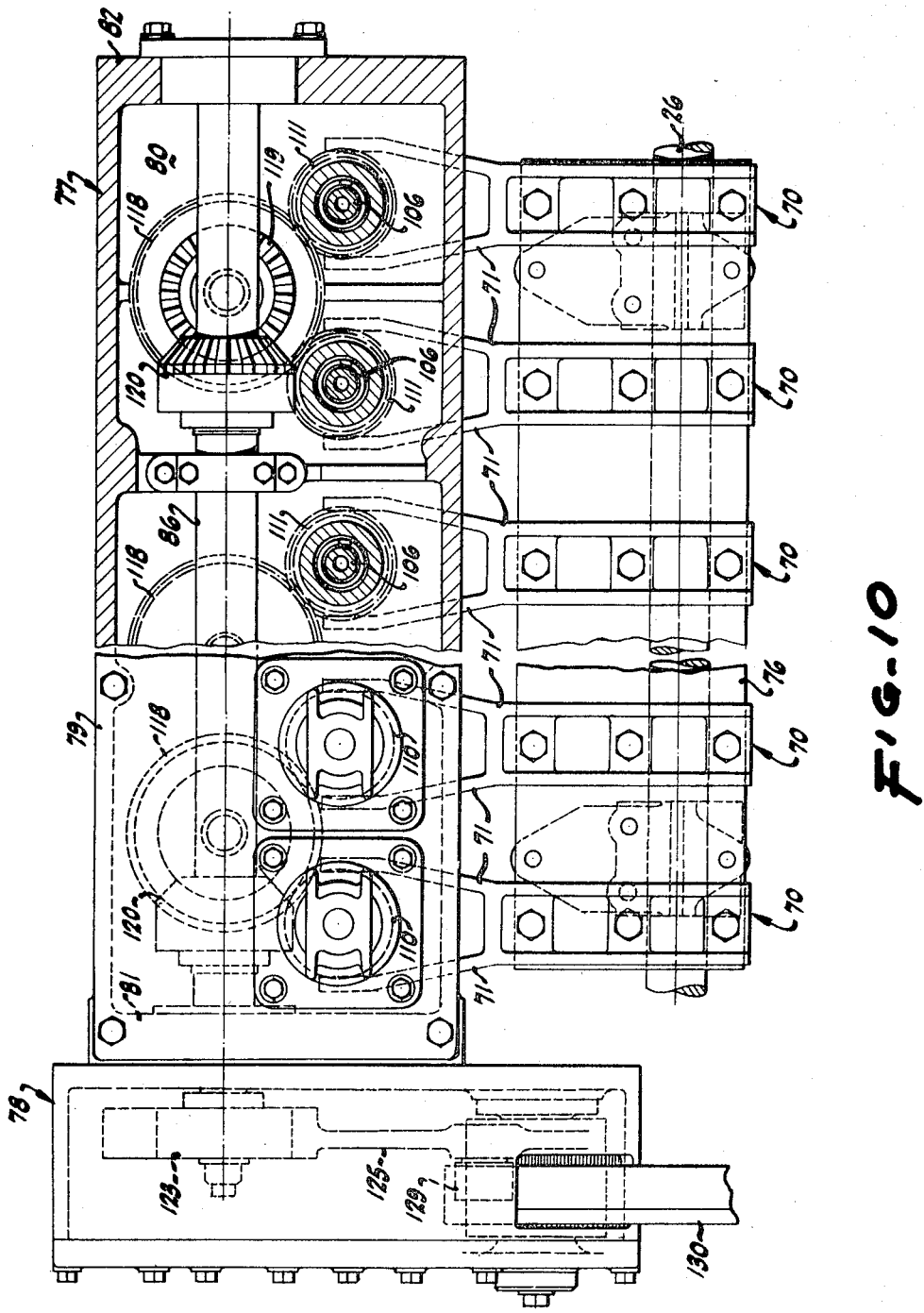
FIG. 10 is a top plan view of the housing of FIG. 9 partly broken away to show the driving elements inside the housing with part of such elements in cross section.

The pitting heads 75 depend from a horizontally elongated housing 77 (FIGS. 9, 10) which housing includes an end compartment 78 at one end thereof (FIGS. 8, 9).

Said housing 77 has an upper wall 79 and a lower wall 80 (FIG. 9) and end walls 81, 82. Bearings 83, 84 respectively in end walls 81, 82 support the ends of a horizontally extending shaft 86. One end portion 87 of said shaft 86 extends into compartment 78.

The pitting heads 75 each have upward extensions generally designated 90 connected therewith, (FIG. 9) that extend upwardly through the lower end upper walls 80, 79 of housing 77, and the collars 74 of the pitting heads are adjacent to and below said lower wall 80.

Each collar 74 is coaxial with, and reciprocably supported, on a central vertical rod 92 (FIGS. 11, 12). A spline 93 connects the collar 74 with rod 92 for rotation of the rod and the collar together, while permitting reciprocable movement of the collar on the rod.

A split coupling 94 connects the upper end of rod 92 with the lower end of a hollow shaft 95 that is integral with and in upward extension to the half 96 of said coupling (FIG. 12), the other half 97 being generally semicylindrical, and connected to the upper end of rod 92 by screws 98. Halves 96, 97 and the portion of rod 92 between them are formed with a coaxial bore for a screw 99 that extends therethrough, one end of said screw being in threaded engagement with the portion of the bore that is in the half 96.

The structure of coupling 90 enables quick removal and replacement of a pitting head 75 outside the housing 77, if necessary.

Hollow shaft 95 (FIG. 9) extends into the lower end portion of an outer rotary shaft 100 and is connected with shaft 100 by a spline 101 for rotation together with shaft 100 while permitting axial reciprocatory movement of shaft 95 relative to shaft 100.

The outer shaft 100 is supported at its lower and upper ends in bearings 104, 105 (FIG. 9) that are respectively carried by the lower wall 80 and upper wall 79 of housing 77.

Outer shaft 100 terminates approximately at the upper side of an upper bearing 105.

Threadedly extending into and connected with the upper end of shaft 95 is the lower end of a spindle shaft 106 that is spaced within the outer shaft 100. The upper end portion of spindle shaft 106 is slidably and rotatably supported in a vertical bearing 107, which bearing, in turn, is threadedly connected with an annular nut 108 through which the bearing 107 extends, which nut is adapted to be tightened against the upper edges of the outer shaft 100 for rotation with the latter.

The upper side of nut 108 is formed with a annular upwardly opening recess in which a shock-absorbent ring 109 of rubber or similar material is secured, and an inverted cuplike hood 110 is releasably secured on the upper end of the spindle shaft 106, within which the upper end of the upper bearing 107 is adapted to be received upon downward movement of the spindle shaft. The lower annular edge of the hood 110 may engage the shock absorbent ring 109 upon lowering of the spindle shaft 106 to the lower end of its movement. In any event the ring 109 will limit downward movement of the hood and said spindle shaft.

A pinion 111 is formed on the outer tubular shaft 100 at a point spaced between the upper and lower walls of housing 77.

A helical spring 112, coaxial with spindle shaft 106 is around the latter in the space between said shaft 106 and outer shaft 100. This spring reacts between the upper end of the hollow shaft 95 and the lower end of the upper bearing 107 to yieldably resist upward movement of the hollow shaft 95 and to yieldably urge it downwardly. Upward movement of the collar 74 through rocking of rock shaft 26 moves the spindle shaft upwardly to its elevated position.

The spindle shaft assemblies, each of which include the lower hollow shaft 95 and the connector for connecting the latter with a pitting head 75, are arranged in pairs in a row that is alongside the horizontal shaft 86 that, in turn, extends through housing 77 longitudinally of the latter.

ROTATION OF PITTING HEADS

Directly below shaft 86 and equally spaced from the spindle shafts of each pair of the latter, the lower wall 80 is formed with upwardly projecting bosses 115, each of which supports a vertical, stationary stub shaft 116. Each stub shaft 116 carries bearings 117 on their upper ends that rotatably support a set of gears comprising spur gear 118 and a bevel gear 119 coaxial therewith and secured thereto. The teeth of the spur gears are in mesh with the teeth of pinions 111 on the outer shaft 100 of the spindle shaft assembly of each pair, while the teeth of the bevel gear 119 are each in mesh with the teeth of a bevel gear 120 secured on shaft 86. Upon rotation of the shaft 86 in one direction of the spindle shafts 100 and pitting heads 74 will be simultaneously rotated in one direction, and upon reverse rotation of shaft 86 the spindle shafts and pitting heads will be rotated simultaneously in the opposite direction.

A spur gear 123 is keyed on the end of shaft 86 that projects into the end compartment 78 of housing 77, (FIGS. 8, 9) the teeth of which gear 123 are in mesh with the teeth of a segment gear 124 (FIG. 8). Arm 125 on gear 124 is supported by a bearing 126 (FIG. 9) on a pivot 127, the latter, in turn, being supported at its ends in two opposite walls of compartment 78 (FIGS. 8, 9). Arm 125 has a portion 128 offset to one side, which portion carries a cam follower 129. A face cam 130 (FIGS. 2, 8, 9) on the main camshaft 19 extends into the compartment 78 and follower 129 is in the cam track 131 of said cam (FIGS. 2, 9). Upon oscillation of the segment gear 124, under the influence of cam 130, the shaft 86 will be oscillated to cause the pitting heads 74 to be rotated 180° in one direction and then immediately 180° in a reverse direction at equally spaced intervals of time provided for by the contour of cam track 131.

Each spindle shaft assembly hereinbefore described and each pitting head, may be generally described as a pitting head assembly, and the shaft 86 in housing 77 and the various pieces therein and in compartment 78, including the actuating means therefrom, may be generally called the pitting head drive assembly.

THE PITTING HEADS

Specifically referring to FIGS. 11, 12, each pitter head 75 includes a central, vertically elongated shaft 92, the upper end of which is connected by the coupling 94 with lower end of the hollow shaft 95 that extends into the housing 77 (FIG. 9). The collar 74 is below said coupling and the shaft 92 reciprocally extends through said collar, but the shaft 92 is connected with said collar by the spline 93 on shaft 92 for holding said collar and shaft against rotation relative to each other.

Said collar 74 is the one having the radially outwardly opening recess 73 in which rollers 72 are positioned, said rollers being carried on arm 70 that is secured to the rocker shaft 26 (FIG. 8).

Integral with the collar 74 is a base block 136 through which shaft 92 also slidably extends, and said base block has parallel opposite flat sides against each of which the upper end of a stationary cam plate 137 is secured, and from which each plate depends. Plates 137 are planar and are in spaced opposed relation at opposite sides of and spaced from the shaft 92, and their opposed faces are formed with vertically extending cam tracks 138 (FIG. 11) each having oppositely outwardly extending lower end portions 139. These cam tracks are positioned at opposite sides of a vertical plane that is coincidental with the axis of shaft 92 and perpendicular to the planes of plates 137, and are identical except for being offset at opposite sides of said vertical plane and that their lower end portions 139 extend outwardly relative to said plane in opposite directions.

A pair of cranks, generally designated 140, are positioned at opposite sides of the shaft 92, each crank having a relatively short vertically extending arm 141 and a longer horizontally extending cam 142 (FIG. 11). The shorter arms 141 extend upwardly from their juncture with the longer arms, and horizontal pivots 143 at said junctures pivotally connect the cranks with members 144 that are rigidly secured to the shaft 92 at opposite sides of the latter, said shaft being flattened at said opposite sides (FIG. 12) from the upper edges of said member, downwardly, for securement of said members against said flat sides by coaxial screws 145 (FIG. 11) extending into the shaft. The shaft 92 may be rabbited longitudinally thereof along opposite side edges of the flattened opposite sides to receive flanges 146 along the side edges of the members 144 (FIG. 13) to secure said members rigid with the shaft against rotation about the axis of said screws 145.

Collar 74 is in its uppermost position on shaft 92 when it is against the coupling 94, and when in said uppermost position, the upper end of the shorter crank arm 141 of each crank is adjacent to and in opposed relation to the open side of the lower portion 139 of a cam track 138 (FIG. 11). A cam follower 147, rotatably carried on said upper end of each shorter crank arm 141, extends into said lower portion 139 of the cam track adjacent thereto. The pivots 143 are spaced below the lower ends of cam plates 137 and the longer crank arms 142 extend from said pivots 143 horizontally across opposite sides of shaft 92. Cranks 140 are of the same structure and arms 142 extend horizontally across opposite sides of shaft 92 from pivots 143 to points spaced equal distances outwardly of shaft 134.

The outer ends of the longer crank arms 142 are formed with through bores of pivots 150 that are respectively integral with cross elements 151 (FIGS. 11, 12). One element is at each of the opposite sides of shaft 92, and the upper end of a rod 152 reciprocably extends through each element 151. Rods 152 extend convergently downwardly to points at opposite sides of the lower end portion of shaft 92 and a flat-sided enlargement or head 153, rigid with the lower end portion of each rod, extends between an opposed pair of ears 154 that are integral with and project from one side of a clevis generally designated 156, having an opposed pair of arms 157, 158 projecting from its opposite side. A pivot 159 extends through ears 154 pivotally connecting the lower end of each rod 152 to one of the clevises (FIGS. 11, 12, 14).

Coaxial horizontal pivots 160 (FIGS. 12, 14) threadedly extending into the lower end of shaft 92 and projecting oppositely outwardly therefrom, extend through the arms 157, 158 of the arms of clevises 156 pivotally connecting said arms with said lower end of shaft 92.

A helical or coil spring 161 (FIG. 12) around each rod 152 reacts between a flange on a collar 162 that is slidable on each rod adjacent to each and below each element 151 and a flange on a similar collar 163 adjacent enlargement or head 153. The end of each rod adjacent to each enlargement 153 is threaded, and the flange on each collar 163 is against a nut 164 threaded out the lower end of each rod. The upper end of each rod 152 is also threaded, and a nut 165 is on the threaded portion projecting from the upper side of each element 151. Thus the tension of springs 161 can be adjusted and said tension is such that the nuts 165 are yieldably held against the upper sides of elements 151 and the clevises 150 will simultaneously pivot clockwise about one of the pivots 160 for the right-hand clevis in FIG. 14, and counterclockwise for the left-hand clevis upon downward movement of the outer ends of the longer arms 142, but may yield if unexpected predetermined resistance to said pivotal movement of one of the clevises is encountered.

Each clevis 156 includes a head or crosspiece 168 (FIG. 12) from which said ears 154 and arms 157, 158 project. The latter project convergently downwardly from each crosspiece 168 to opposite sides of the lower portions of shaft 92 (FIG. 11).

The aforesaid crosspieces 168 have flat sides that face outwardly to the lower end of shaft 92, and the upper enlarged end portion 169 of a downwardly projecting tine 170 (FIGS. 1–14) is secured against each said flat sides by a screw 171 (FIG. 11). The flat side against which said portion 169 is held is actually the bottom of a recess formed in each crosspiece having straight parallel sides, and the enlarged portion 169 (FIG 12) of the tine is rectangular with straight side edges against said sides of the recess, so the tine is rigid on said crosspiece insofar as rotation about screw 171 is concerned.

Secured on the lower end portion of shaft 92 at the sides that are at right angles to the sides against which members 144 are secured are the upper end portions 172 of a pair of downwardly extending supports 173 (FIG. 12) against the lower ends of which is secured at flat horizontally disposed annular member 174 (FIG. 13) by screws 175. The lower end portions of supports 173 are offset to one side of each of the coaxial pivots 160 (FIG. 14) in the same direction circumferentially of the member 174 to avoid the latter and the ends of arms 157, 158.

When the collar 74 on shaft 92 at the upper end of the pitting head is in its uppermost position, the terminal lower ends of the tines 170 are approximately even with the lower surface of the annular member 174 and are within opposedly opening recesses 176 formed in the opposed radially inner sides of said member.

Tines 170 preferably are slightly curved toward each other in a downward direction and come to a point at their lower terminal ends. From said lower ends they become progressively wider (FIG. 11) in an upward direction to the enlarged upper portion 169. The pitting head rotates in one direction about the axis of shaft 92 during the effective pitting operation, thus each tine has a leading edge 177 and a trailing edge 178 (FIG. 12). Said trailing edge of both tines may be substantially straight, axially of shaft 92 and substantially in a vertical plane bisecting the shaft longitudinally thereof, while the leading edge is slightly slanted outwardly of said plane from its pointed end to the upper portion 169 (FIG. 12) and the sides of each is slightly bevelled from edge 177 and 179 so that said leading edge will not engage the pit of an drupe that is between the pair of teeth, as will be explained more in detail later on.

Shaft 92 is formed with a central downwardly opening bore 180 in which a rod 181 (FIG. 11) is vertically reciprocable. The upper end 182 of said rod 181 is enlarged, as is the upper portion of bore 180, and said enlargement is adapted to abut an axially upwardly facing shoulder at the juncture between the enlarged upper end of bore 180 and the lesser diameter lower end to restrict downward movement of said rod. An expansion coil spring 183 reacts between head 182 of rod 181 and a closure in the upper end of said bore 180 to yieldably urge rod 181 downwardly. A transversely elongated pit-engaging element 184 (FIGS. 13, 14) rotatably secured by a screw 185 on the lower end of rod 181 is positioned with its lower surface slightly below the plane of lower surface of the annular member 174.

Each intermittent rotation of shaft 36 of conveyor 6 by rotation of the index plate 37, as hereinbefore described, moves the cups 5 of each transverse row thereof into alignment with, and below, the row of pitting heads 75 with the lower ends of the pitting heads spaced above the cups and above the drupe halves that are in said cups.

DRUPE CONVEYOR

Conveyor 6 includes a pair of sprocket wheels 186 (FIG. 1) adjacent the ends of he shaft 40 on one end portion 39 of which the index disc or plate 37 is secured (FIG. 4). shaft 40' at the opposite end of said conveyor (FIG. 1) has a pair of sprocket wheels 186', similar to wheels 186, secured thereon. A pair of endless sprocket chains 187 extend over said pairs of sprocket wheels and metal strips 188 (FIG. 16) extend between the chains and are secured to links of the latter, thus providing an endless row of said strips in parallel side-by-side relation. Each strip is formed with a row of openings 189 (FIG. 17) in each of which an annular casting 190 for each cup 5 extends. Each strip 188 has flanges on sides 191 along its longitudinally extending edges that are directed inwardly relative to the endless chains whereby each strip is of channel shape in cross-sectional contour, the flanges or sides 191 providing rigidity for the strips. Radially outwardly projecting ears 192 (FIG. 16) on each casting 190 is adapted to overlie the outer surface of each strip around each opening and screws 193 (FIG. 17) threaded into openings in said ears extend through openings in said ears and secure the castings to each strip.

Each cup 5 is of rubber or rubberlike plastic material and is of conical shape with the larger diameter end open and facing outwardly of the conveyor, and the smaller diameter end of each cup is closed by an imperforate bottom wall 195 of said material (FIG. 17). The sidewalls 196 of each cup are formed with straight ribs 197 of uniform width extending divergently relative to each other from said bottom wall outwardly to the outer side of said cup. Said ribs are rounded on their outer sides to prevent injury to the convex outer surfaces of drupe halves seated thereagainst, and to hold such halves against rotation relative to the cups when said convex surfaces are forced thereagainst.

The radially outermost portion or rim 198 of each cup is relatively thick, and spaced inwardly from said rim is a depending cylindrical portion 199 that is adapted to seat in an annular outwardly opening recess 200 in the casting 190. The radial inner side of said portion 199 is formed with radially inwardly projecting segments 201 adapted to snap into complementarily formed recesses in the inner sidewall of each recess 200 for releasably holding the cups in the castings 195.

Lugs 204 (FIG. 15), secured to the ends of the strip 188 project from the same sides of said strips as flanges 191, and the outer ends of said lugs are connected to links of chains 187, and said chains are slidably supported on tracks 205 (FIG. 15) that are, in turn, secured on angle strips 206 of the frame 10. The strips that are below the pitting heads are supported on members 207, which members are stationary on a cross frame member 208 that is secured at its ends to said angle strips 206 centrally between its ends, strips 188 are each provided with a bearing element 209 slidable on a piece 210 secured to said cross frame member 208.

By this structure the cups of the rows of cups are adequately supported from below at the pitting station for resisting downwardly movement when the pitting heads descend into contact with the drupe halves in the cups 5.

PITTING OPERATION

The collar 74 of each pitting head and all of the elements connected with or mounted on the vertical shaft 92 including the annular drupe-engaging member 174 on the lower end of said head, are adapted to move downwardly, as a unit, with the tines 170 retracted in the position shown in FIGS. 11-14.

Immediately upon the lower surface of the annular member 174 engaging the flat or planar upper surface of a drupe half supported in a cup 5, the collar 74 of each pitting head and cam plates 137 thereon, will continue downward movement under the influence of rollers 72 on arm 70 (FIG. 8). The shaft 92 that carries the cam followers 147 will be stopped by the engagement of annular member 174 with the planar upper face of the drupe half, but continued downward movement of the cam plates 137 will actuate followers 146 so that cranks 140 will cause the outer pointed ends of the tines 170 to start to move along paths 213 (FIG. 14) until the tines are in pit-engaging positions 214. The tines are moved to said positions 214 under the influence of movement of cam followers 147 in the lower portions 139 of cam tracks 138, and springs 161 (FIG. 11) reacting against the lower ends of rods 152 (FIG. 12) will result in applying an upward yieldable pressure of tines 170, as indicated by arrows 216 (FOG. 14), against the convex underside of pit 217, thus tending to draw the pit out of the pit cavity in the drupe half while the body of the drupe half is held against the annular member 174. The fibers connecting the pit with the pit cavity are placed under tension, and at the same time the element 184, which may be called a "foot," extends across the pit approximately from edge-to-edge, and spring 183 yieldably maintains the foot against the pit, although the spring 183 that provides such tension, is light relative to the tension of springs 161.

The limit of downward movement of the collar 74 on each pitting head is determined by the limit of downward movement of the hood 110 on the upper end of spindle shaft 106 (FIG. 9). The lower surface of the hood sides are adapted to engage the bumper rings when the downward limit of the movement of the pitting is reached, although normally the pitting head would not reach the downward limit of its movement, even when the peach half was relatively small.

When the cam followers 147 are in the vertical upper portions of cam tracks 138 the tines will remain in the final position to which they have been moved, which may vary somewhat, according to the size of the pit. The smaller the diameter of the drupe, the farther the head 75 will move downwardly before the tines are actuated, and the tines are actuated during the one-inch downward movement of the collar following the engagement between the annular member 174 and the planar upper surface of the peach.

After such final downward movement of the collar and the drupe half is firmly seated in a cup, the cam 130 on camshaft 19 will actuate the cam follower 129 and segmental gear 124 to rotate the pitting heads 180° in each of two opposite directions to break the fibers connecting the pits in the pit cavities, ad to remove the pits by a torque action resulting from weakening the attachment of the pits to the sides of the pit cavities and the frictional engagement between the pit and the tines. The double bevelled leading edges of the tines provides a wedge effect as the tines move around the pit and this effect, together with the tension of springs 161 tending to draw the pit out of the pit cavity and the torque force applied to the pit, combine to break the tensioned fibers connecting the pit to the body of the drupe forming the pit cavity and to rotate the pit relative to the body of the drupe half. The tines are in frictional engagement with the pit during rotation of the head to free the pit.

The timing effected by the cams hereinbefore described is such that, after an advance of the conveyor to position a row of cups having drupe halves therein below the pitting heads, the index lug 47 moves out of the recess 38 in the index plate, while stationary lug 62 moves into a recess 38, thus holding the conveyor stationary, and at the same time the heads 75 are moved down to effect gripping of the bodies of the drupe halves between the conveyor cups 5 and the annular members 174. While the conveyor is still stationary the heads 75 are rotated to remove the pits and the index lever 32 returns to a position for reengagement of the lug 47 in a recess 38 in the index plate, after which the heads 75 are moved upwardly and the lug 47 moves into a recess 38 while lug 62 is moved out of its recess 38, and thereafter the index lever 32 is actuated to move the conveyor for positioning another row of drupe-filled cups to a position below the row of pitting heads.

LEVELLING HALVES ON CONVEYOR FOR PITTING

Referring to FIG. 1, water from any suitable source is supplied, under pressure, through conduit 222 to a pipe 223 that, in turn, supplies water to the cylindrical, horizontally elongated manifold 7. Said manifold extends transversely across the conveyor 6 spaced over and parallel with a transversely extending row of cups 5 at the drupe-receiving end of conveyor 6. A horizontal pipe 224 (FIG. 22) is connected at one end with pipe 223, and extends centrally into the manifold 7 through one closed end of the latter, and to the opposite closed end. Pipe 224 is spaced within manifold 7 and is formed with a plurality of discharging water uniformly into said manifold from end to end of the latter. The manifold itself is formed with a plurality of spaced pairs of spaced discharge openings or outlets in one side intermediate the vertical dimension of the manifold.

Each pair of outlets is spaced above one of the cups 5 of conveyor, for discharge of water from each pair of into the cup therebelow at points spaced at opposite sides of the vertical axis of the cup. As previously noted, the cups have imperforate bottom walls and sides; hence they will hold the water.

At substantially the time water is discharged into each cup, a drupe half will have been deposited therein from the dump feeder 4 with its convex side facing downwardly.

The drupe halves, when carried by the conveyor 6 to positions below the pitting heads, should have their planar upper surfaces horizontal or substantially parallel with the plane in which the members 174 of the pitting heads are positioned. When the drupe halves are deposited in the cups, their convex surfaces face generally downwardly but their planar upper surfaces may be tilted relative to horizontal. The presence of water in the cups to a level sufficient to float or semifloat the halves reduces any frictional resistance between the ribs in a cup and the convex surface of the drupe half in engagement therewith sufficiently to enable the halves, under the influence of gravity, to automatically adjust themselves in the cups so their planar sides are horizontal when they reach the pitting heads. A valve 227 in feedpipe 223 provides for adjusting the level of water fed into the manifold to develop the desired amount of water from the outlets 226 for falling, by gravity, into the cups 5, during the period of time when the cups are below the outlets. It is important that the manifold be level to uniformly discharge water from outlets 226, and the conveyor and pitting heads should also be levelled.

The drupe halves are lighter than water; hence, they may fully or partially be supported by the water.

In actual practice, the intermittent movement of the cups toward the pitting head will readily cause any drupe halves that may be partially supported on the ribs 197 to adjust themselves under the influence of the movement of the water as the cups start and stop on their way to the pitting heads.

Should any of the planar upper surfaces of the drupe halves be slightly tilted relative to horizontal by the time they are under the pitting heads, due to abnormality in the halves or for any other reason, the halves will readily adjust themselves, free from injury thereto, to the plane of the members 174 when engaged by the latter due to support afforded by the water in the cups.

The space between the ribs 197 provides passageways for passage of water from the mainfold into the cups past the convex sides of the drupes, and for discharge of water that may be displaced by the drupe halves.

The aforesaid levelling of the upper planar surfaces of the drupe halves precludes injury to the halves such as would occur were the levelling to be attempted solely by downward movement of the annular members 174 on the lower ends of the pitting heads, or solely by application of mechanical force with the full weight of the halves on the cups or holders 5.

PITTING HEAD CLEANERS

A pipeline 228 connects the source of water 222 with a horizontal pipe 229 (FIGS. , 24) that extends transversely across and parallel with one side of the row of pitting heads 75. This pipe carries a plurality of pairs of laterally and downwardly directed ejection nozzles 230 that are directed toward and into the pitting heads 75 at their lower ends of one the lower end portions of the pitting heads after each pitting operation to clean off any matter that may cling to the latter after each pitting operation. The pitting heads are in their elevated positions when so cleaned, so there is no impact of water against the drupe halves in the cups. A value 231 in pipe 228 controls the flow of water to nozzles 230 and a valve 232 in the fitting supporting each pair of nozzles 230 may be adjusted to control the flow of water to the nozzles of each pair.

DRUPE FEEDER AND ORIENTER TO CONVEYOR

A combination dump feeder and orienter 4 is described in detail in copending application Ser. No. 813,955, filed Apr. 7, 1969, and comprises a horizontal shaft 237 (FIGS. 19-21) having a ratchet wheel 238 (FIG. 1) on one end that is adapted to be intermittently rotated in one direction by engagement with a pawl 239 that is supported on one end of an arm 240 rotatable on shaft 237 for oscillation by a generally reciprocating movement of a link 242 that, in turn, is connected at one end with the outer end of an arm 243 secured at its opposite end on a shaft 244. Shaft 244 actuates an eccentric 245 that, in turn, is one of the actuating elements of the feeder for moving parallel rows of drupe halves, step by step, in one direction up the feeder 3 for discharge onto the dump feeder 4. The feeder 3 as described in detail in said U.S. Letters Pat. 3,547,249 is preferable, although a conventional shuffle feeder may be used and as there is a similarity in the action, the feeder 3 will be called an eccentric feeder to distinguish it from the dump feeder 4.

Referring to the dump feeder 4 the latter comprises a row of generally polysided bodies 246, (FIGS. 19-21) secured on shaft 237, the sides 247 of which face radially outwardly of shaft 237. Between each intermittent movement of shaft 237, one of the sides 247 of the dump feeder faces upwardly to receive a drupe half discharged from the upper end of the eccentric feeder.

A chute 248 (FIGS. 19, 20) between the upper end of the eccentric feeder 3 and dump feeder 4 conducts the drupe half down the chute for discharge onto the upper surface of the dump feeder.

Figure 19:
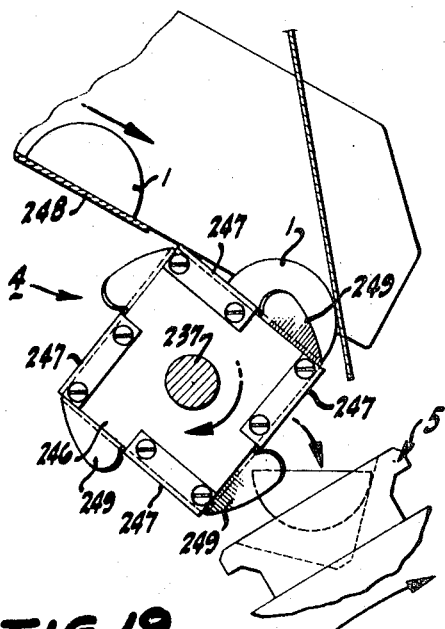
FIG. 19 is an enlarged, side elevational view, partly in cross section, of the feeder shown in FIG. 18, illustrating a feeding step in which a drupe half having its planar face directed downwardly is inverted upon dropping into the cup of the conveyor.
Figure 20:
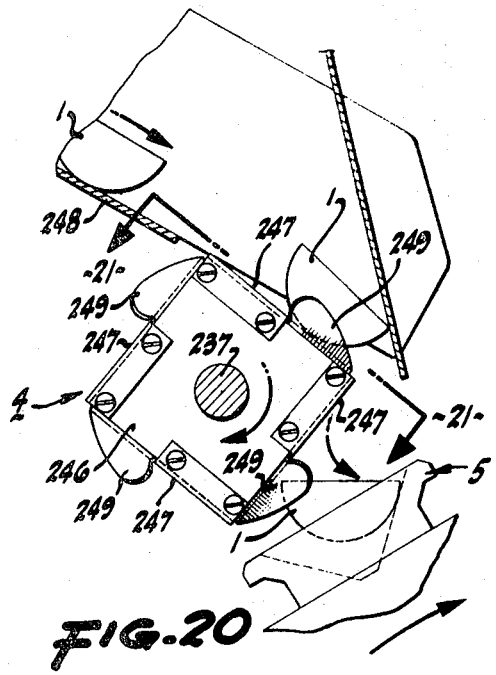
FIG. 20 is a view similar to FIG. 19 in which a drupe half having its planar cut face directed upwardly is fed into the cup of the conveyor without inverting it.
Figure 21:
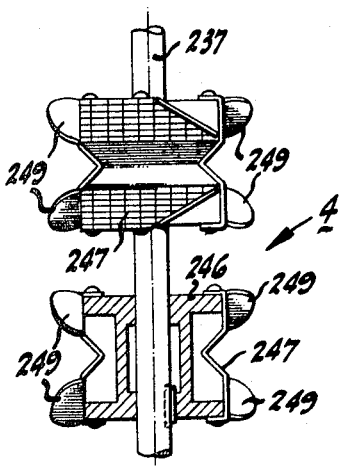
FIG. 21 is a fragmentary reduced size plan view of one of the elements of the feeder as seen from line 21—21 of FIG. 20 and of an adjacent feeder element in cross section.

Upon the drupe half sliding onto the upper surface of the dump feeder, and as the latter is rotated clockwise as seen in FIGS. 1, 19 and 20 in one direction to tilt said upper surface, the drupe half will slide forwardly down the incline where it will engage a pair of spaced ears 249 projecting radially outwardly from one side of the drupe feeder, and a further tilting of said surface results in the drupe half being pivotally dumped off the dump feeder and into one of the cups therebelow with its planar face facing upwardly if said face was against the upper surface 247 of the body 246. If the convex side of the drupe half was against the upper surface 247 of body 246, it will slide outwardly of the ears and off the latter for falling into a cup with its cut face directed upwardly. Hence, irrespective of whether the drupe half is deposited on the dump feeder with its cut face directed upwardly or downwardly, it will be discharged into a cup 5 at the receiving end of conveyor 6 with its cut face directed upwardly.

FIGS. 19, 20 show the operation of the dump feeder, and the manner in which the halves are discharged therefrom, all of which is described more in detail in said copending application Ser. No. 813,955. In FIG. 19, a half 1 was positioned on the upper surface 247 with its planar cut face against said surface, and in FIG. 20 the drupe half was positioned on said upper surface with its convex side against said surface.

ECCENTRIC FEEDER

The feeder 3, which has been called an eccentric feeder, comprises a plurality of sets of elongated striplike elements in parallel vertical planes simultaneously inclined upwardly from one of their ends. Each set comprises a pair of drupe-carrying elements 252 (FIGS. 18, 26) at opposite sides of a stationary drupe-holding rail 253. Each pair of elements 252 has a corresponding number of upwardly opening recesses 254 (FIG. 18) in their upper edges and the intermediate rail 253 also has the same number of recesses 255 in its upper edge. Each recess 254, 255 is adapted to receive a drupe half 1 therein and the elements 252 at opposite sides of the rail 253 will carry a drupe half that straddles the rail 253 of each set (FIG. 26) upwardly up the incline of the elements and will deposit it in the next higher recess 255 in stationary rail 253 upon circular movement of elements 252 in vertical planes. Thus, with each complete revolution of the elements 252 the drupe halves in rail 254 will be simultaneously moved upwardly along the rail 254 until the drupe halves are delivered, one at a time, onto each chute 248 for discharge into the dump feeder.

Eccentric 245 (FIGS. 18, 26) on a shaft 244 (FIG. 18) supports one of the ends of the pairs of elements 252 for circular movement in vertical planes, and a similar eccentric (not shown) on a separate shaft parallel with shaft 244 supports the lower ends of said elements for said movement, a chain 258 (FIG. 1) extending over sprocket wheels on said shafts connects them for movement. The connection 240, 242, 243 between shaft 244 and shaft 237 for actuating the dump feeder and orienter 4 in synchronism with the eccentric feeder has been mentioned.

Figure 18:
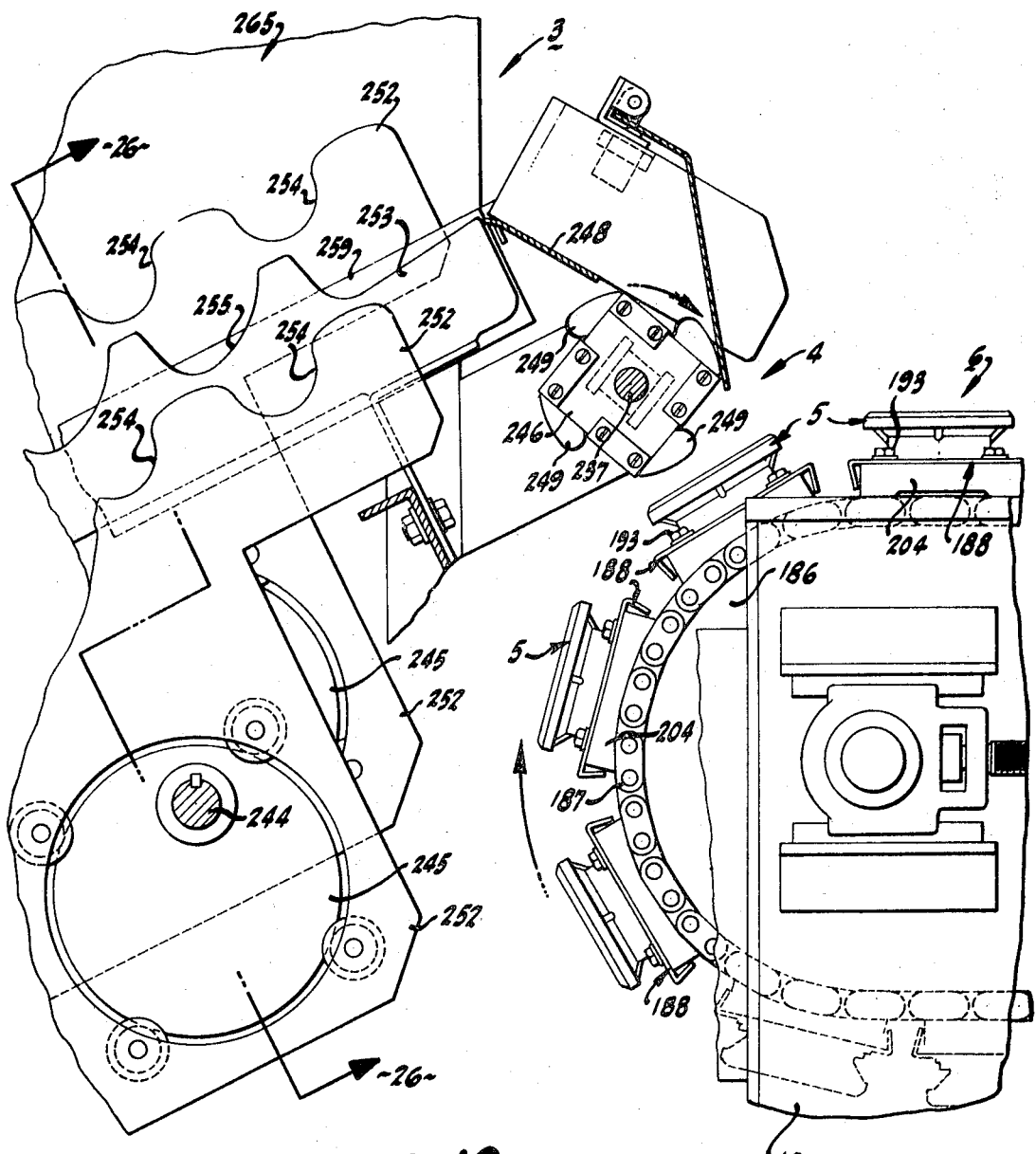
FIG. 18 is a fragmentary enlarged side elevational view, partly in cross section, of the drupe receiving end of the conveyor for carrying drupe halves to the pitter, showing feed means, partly in cross section, for depositing drupe halves into the cup of the conveyor and orienting the halves so their convex sides are seated in the cups.
Figure 26:
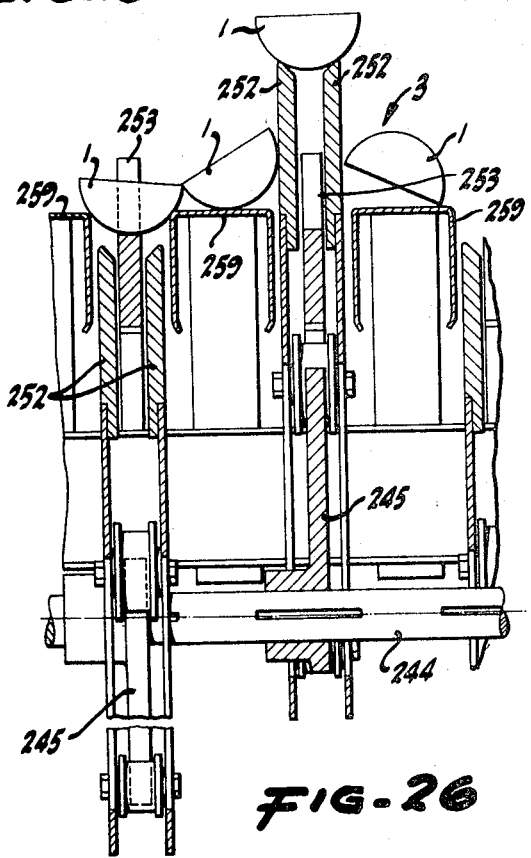
FIG. 26 is a fragmentary cross-sectional view generally along line 26—26 of FIG. 18.

There may be any desired number of sets of the feeding elements and rails in feeder 3, but preferably there is an even number, such, for example, as eight, in which case the eccentrics 245 of alternate sets are offset to opposite sides of the shafts 244 so as to counterbalance each other, (FIGS. 18, 26). Obviously the number of dump feeders 4, and rows of cups 5 and the number of pitters 8 correspond to the number of sets of feeding strips 252, 253.

At opposite sides of the pair of elements 252 of each set is a drupe-receiving strip 259 (FIGS. 18, 26) that is parallel with said elements, and which strip is horizontally disposed in transverse, cross-sectional contour, said strips extending from end to end of said elements and function to receive surplus drupe halves of more than one, that may be initially positioned in a mass over the lower ends of the strips and elements, and picked up by the latter, ad wen such surplus halves are dislodged and discharged to one side or the other of each set of elements, they will slide down the strips 259 and into the mass of halves waiting to be picked up by elements 252. Said strips also function to support drupe halves when one of the latter is in a recess 255 in a rail 253 during the interval between upward movement of the elements for carrying the half to the next higher recesses 255. Thus the pairs of strips 259 contribute to centering halves relative to the stationary rails 253, (FIG. 26).

Figure 25:
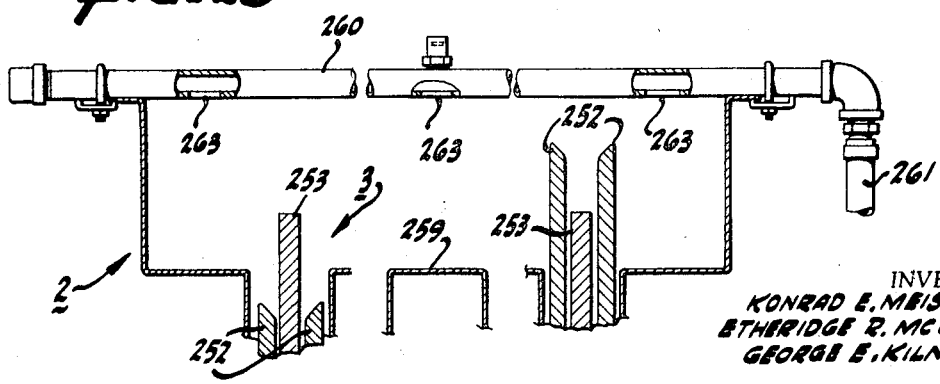
FIG. 25 is an enlarged, fragmentary, cross-sectional view generally along line 25—25 of FIG. 1, showing a portion of the water system over the upper end of the inclined feeder for feeding drupes to the device shown in FIG. 19.

A pipe 260 (FIGS. 1, 25) extends tranversely over the upper portions of the sets of strips 252, 253, and over strips or plates 259. Said pipe is connected by a pipe 261 with the source of water 222 and downwardly directed outlets 263 along pipe 260 are positioned over the plates 259 to maintain its upper surface in a slippery condition to facilitate rapid downward sliding of the surplus drupe halves that are deposited thereon. A valve 264 in said pipe 261 is for controlling the discharge of water from pipe 260. A hopper, generally designated 265, includes walls at the sides and lower end of the assembly of elements 252, 253, and 259 and to retain a mass of indiscriminately arranged drupe halves over the lower end portions of said elements and rails.

DRIVE MEANS

A sprocket wheel 267 (FIG. 1) on shaft 244 of the feeder 3 connects by a chain 268 with a sprocket wheel 269 on a jackshaft 270. A second sprocket wheel 271 on jackshaft 270 is connected by a chain 272 with a sprocket wheel 273 on a jackshaft 274 that is adjacent to the pitter 8, (FIG. 1). A second sprocket wheel 275 on jackshaft 274 is connected by a chain 276 with sprocket wheel 277 on camshaft 19 (FIGS. 1, 2). As already described, sprocket wheel 16 (FIG. 3) which is driven by motor 15 is connected with sprocket wheel 18 (FIG. 3) on camshaft 19, driving the latter. This basic train of sprocket wheels and chains actuates the system disclosed in FIG. 1.

OPERATION

In operation, drupe halves having either half or whole pits therein are fed into hopper 265, but only to a level sufficient to cover the lower end portions of elements 252, rails 253, and strips 259. These drupe halves are indiscriminately positioned insofar as their generally hemispherical and planar surfaces are concerned.

Any suitable means may be provided to feed drupe halves into hopper 265 and to prevent overloading the hopper. It is along the portions of elements 252 and rails 253 that extend slantingly upwardly out of the mass of drupe halves where surplus drupes that may be caught by said elements will be discharged to one side or the other of the pair of elements of each set thereof for sliding back to the mass that covers the lower end portions of said elements.

At the upper end of the pairs of elements of each set, a drupe half carried to said upper end will be intermittently pushed onto the dump feeder 4, which dump feeder is intermittently actuated in timed relation to the feeder 3 to have a drupe-supporting surface 247 below the discharge end of each chute 248 in a position to receive the drupe half discharged from each chute.

The drupe half deposited onto the upper surface of the dump feeder may have its planar surface or its convex surface facing upwardly. The dump feeder, upon sufficient inclination of its drupe-supporting surface relative to horizontal, during its rotation, will discharge the drupe half thereon into a cup 5 of conveyor 6 with the planar surface of such drupe half facing upwardly, irrespective of the position of the drupe half at the time it was discharged from the feeder 3. Thus the dump feeder also functions as a drupe orienter.

The conveyor 6 is driven in timed relation to the dump feeder so that a cup 5 in each row to be in a position below each cup at the time a drupe half is discharged from a dump feeder 4.

After a drupe half is deposited in each cup 5, water is deposited in each cup to float or buoy the drupe half sufficiently for it to automatically level its upwardly facing planar surface, and this automatic levelling occurs when the water is deposited in each cup or during actuation of the conveyor to conduct the halves to the pitter. During this period when the halves are carried from the dump feeder to below the pitting heads, an operator at one or both sides of the conveyor 6 may inspect the halves and remove any halves that are defective or that may appear to be unsatisfactory for successful pitting.

When the cups of a transverse row thereof are beneath the pitting heads, the conveyor 6 will remain stationary and locked against movement during the period as the pitting heads are moved downwardly against the cut or planar faces of the drupe halves and as the tines 170 move into engagement with the pits and the heads are rotated to separate the pits from the drupe halves. The heads then rotate back to their original positions and are elevated, freeing the pit held by the tines, and the conveyor is moved to bring another row of cups below the pitting heads for pitting thereof. Those drupes that are pitted will be discharged at each movement of the conveyor, and the water will be discharged from the cups.

The apparatus as hereinbefore described provides for a method of automatically pitting drupe halves starting with a bulk mass of indiscriminately arranged, unpitted, drupe halves from which mass, successive batches or groups of a predetermined number are automatically removed, without regard for the positions of the halves, and the halves of each batch are conducted along separate paths of travel to below an equal number of pitting heads.

On the way to said heads the halves in each batch are automatically positioned so their planar faces will be facing upwardly for pitting, and also said faces are automatically levelled to be in one horizontal plane.

When the halves reach the pitting station, or the pitters, the latter automatically and simultaneously engage the pits in the drupes of a group or batch and separate said pits from the drupes by forcing the pits outwardly of the drupe bodies and at the same time applying a rotary force to the pits while the bodies of fruit are held stationary, and thereafter the pitted halves are removed from their said paths of travel.

The concept of removing a relatively large number of drupe halves from a mass thereof in which said halves are indiscriminately arranged relative to each other, and simultaneously orienting them and pitting them, is a substantial improvement over a method in which halves are singly pitted, or in which drupes are bisected to provide a pair of halves and the halves of such pair are pitted.

Also, in the present apparatus, all of the elements for accomplishing the desired results are connected for synchronous operation from a single source of power.

We claim:

1. Apparatus for removing pits from drupe halves, each of which halves has a planar surface on one side and a generally hemispherical convex surface on the other side extending to said planar surface with a pit cavity in said planar surface having a pit held therein, comprising the combination of:
   a. drupe-delivering means actuable for movement for supporting and for delivering and discharging therefrom drupe halves indiscriminately positioned with respect to their planar surfaces, one at a time, onto a drupe-orienting means,
   b. drupe-orienting means for receiving said drupe halves discharged from said drupe-delivering means, actuatable for movement for discharging the drupe halves received thereon onto a conveyor means with their planar faces facing in approximately the same direction, and outwardly of said conveyor means,
   c. conveyor means for so receiving said drupe halves and actuatable for movement of a pitting means at a pitting station, in positions with their planar faces in space, opposed relation to said pitting means,
   d. pitting means at said station actuatable fro movement into engagement with the pit in a peach half for engaging said pit and for receiving said pit from said half and for discharging said drupe half from said pitting means,
   e. single actuating means operatively connected with said drupe-delivering means, drupe-orienting means, conveyor means and pitting means, for actuating them automatically, in succession.

2. In apparatus as defined in claim 1, in which
   f. said pitting means includes a drupe-engaging surface for engaging, positioning and holding the drupe half on said conveyor means that is opposed thereto stationary against movement during removal of the pit by said pitting means.

3. Apparatus for removing pits from drupe halves, each of which halves has a planar surface on one side and a generally hemispherical convex surface on the other side extending to said planar surface with a pit cavity in said planar surface having a pit held therein, including the combination of:
   a. a feeder for receiving thereon said drupe halves, one at a time, for supporting said halves thereon with their planar faces facing either upwardly or downwardly, and a feeder-support supporting said feeder for movement from a drupe-receiving position to a discharge position,
   b. orienting means on said feeder engageable with a drupe half thereon upon movement of said feeder to said discharge position for automatically positioning and discharging each drupe half therefrom with its planar surface facing upwardly irrespective of whether it is initially supported on said feeder with its planar or convex surface facing upwardly,
   c. an endless horizontally extending conveyor having a row of cuplike, upwardly opening supports extending from said feeder to a pitting station, and conveyor supporting means supporting said conveyor for said movement with each cuplike support at said feeder in a position to receive a drupe half from said feeder with a planar surface of each drupe half facing upwardly,
   d. a pitting mechanism supported over said conveyor at said pitting station including pit-engaging and removing means supported for movement into engagement with a pit in a drupe half in one of said cuplike supports at said pitting station and
   e. actuating means operatively connected with said feeder, conveyor, and pitting mechanism, respectively, for actuating them in timed relation to each other.

4. In the apparatus as defined in claim 3;
   f. said actuating means comprising a single, continuously revolving camshaft connected with a source of power fro rotating it in one direction at a uniform rate of speed, and
   g. control means operatively connecting said actuating means with said feeder for intermittently actuating said conveyor for carrying said drupe halves from said feeder to said pitting station, and for actuating said feeder and said pitting mechanism only during the interval between each intermittent movement of said conveyor.

5. The combination as defined in claim 4, including
   h. drupe levelling means over said conveyor adjacent to said feeder for positioning each drupe half after discharge thereof into one of said cuplike supports in a position with its planar face horizontal, and
   i. said pitting mechanism including a horizontal plate movable into engagement with the horizontal upwardly facing surface of each drupe half positioned below said mechanism during actuation of said pitting mechanism for firmly clamping such drupe half between said plate and a cuplike support during removal of the pit in said last-mentioned drupe half by said pit engaging and removing means.

6. In the combination as defined in claim 5;
   j. each of said cuplike supports having imperforate walls for holding water, and
   k. said drupe-levelling means comprising water from a source thereof deposited into each cuplike support for floating a drupe half that has been discharged into such cup whereby the half so floated will automatically position itself under the influence of gravity to a position with its planar surface horizontal.

7. Apparatus for removing pits from drupe halves, each of which has a planar surface on one side and a generally hemispherical convex surface on the other side extending to the edges of said planar surface with a pit cavity in said planar surface and a pit held therein;
  a. a holder for a bulk mass of said drupe halves in indiscriminate arrangement in said mass,
  b. carrier means having inner end portions within said holder within such mass when the later is within said holder and other end portions terminating out of said mass for automatically engaging and carrying drupe halves in spaced relation in separate rows out of said mass to said outer end portions for simultaneous discharge of one of the drupe halves from each of said rows from said outer end portions upon actuation of said carrier means,
  c. a plurality of pitters in a row each including pit-engaging means actuatable for simultaneous movement into and out of the drupe halves of a row thereof when said drupe halves are positioned in a row adjacent said pitters with each half opposite to one of said pit-engaging means,
  d. conveyor means extending between each of said outer end portions of said carrier means and said pitters for respectively receiving a drupe half discharged from said outer end portions and for simultaneously conveying the drupe halves so received in separate rows, to said pitters to positions opposite to each of said pit-engaging means,
  e. actuating means respectively connecting said carrier means, conveyor means, and pit-engaging means for simultaneously actuating said carrier means, conveyor means and pit-engaging means for conducting the drupe halves for said mass to said pitters in spaced relation in separate rows for simultaneously pitting one of the halves from each of said rows by said pit-engaging means.

8. In apparatus as defined in claim 7;
  f. orienting means between said conveyor means and the mass of halves adapted to be held in said holder for automatically positioning each of the drupe halves with its planar face directed upwardly on said conveyor means, and
  g. means supporting said pit-engaging means for downward movement into engagement with the pit in a drupe half therebelow,
  h. said conveyor means including drupe supports for simultaneously positioning one of the drupe halves of each row below each of said pit-engaging means for engagement by the latter upon each downward movement of the latter.

9. In apparatus as defined in claim 7;
  f. means for automatically depositing drupe halves into said holder to maintain the mass of said halves in said holder within a predetermined range of levels.

10 In apparatus as defined in claim 7;
  f. said actuating means including a camshaft supported for rotation, and cam means on said shaft rotatable therewith,
  g. cam-actuatable means connected with said cam means for intermittently moving said conveyor means and said pit-engaging means once during each complete revolution of said camshaft.

11. In apparatus for removing pits from drupe halves, each of which has a planar surface on one side and a generally hemispherical convex surface on the other side extending to said planar surface with a pit cavity in said planar surface having a pit held therein exposed for removal from said cavity, and which apparatus includes pit-engaging means at a pitting station respectively supported for downward movement from an elevated pit-releasing position into pit-removing engagement with the pit in a drupe half positioned below said pit-engaging means and back to said elevated pit-releasing position:
  a. conveyor means having a receiving end and a discharge end, including a plurality of horizontally extending, parallel rows of drupe supports in horizontally spaced side-by-side relation, for supporting a drupe half in each support with its said planar face and the pit in said cavity facing upwardly, and conveyor-moving means connected with said conveyor means for moving the latter in one direction from said receiving end to said discharge end, transversely of said rows to said pitting station adjacent said discharge end for movement of said rows, in succession, to and past said pitting station,
  b. means for supporting said pit-engaging means in a horizontally extending row at said pitting station parallel with and in said elevated pit-releasing position above each row of drupe supports at said station,
  c. pitter-actuating means connected with said pit-engaging means for simultaneously moving said pit-engaging into said pit-removing engagement with the pits in the halves in each row of drupe supports moved to said pitting station by said conveyor moving means and for simultaneously moving said pit-engaging means back to said pit-releasing position for releasing the pits withdrawn from said pits, and
  d. drupe-holding means at said pitting station supported for vertical movement with said drupe-engaging means into and out of engagement with the drupe halves in each row of drupe supports at said pitting station for holding said drupe halves against movement with the pits during actuation of said pitter-actuating means for withdrawing pits from said halves and actuable for said movement by said pitter-actuating means.

12. In apparatus as defined in claim 11;
  e. a feeder actuable for movement for feeding drupe halves, one at a time, onto each support in each row thereof at said receiving end of said conveyor, with the planar surface of each half facing upwardly,
  f. feeder-actuating means connected with said feeder for moving the latter for feeding drupe halves into each row of said drupe supports at said receiving end of said conveyor upon movement of each row to a drupe-receiving position,
  g. a single, power-actuated means operatively connected with said conveyor moving means, pitter-actuating means, and said feeder-actuating means for intermittently moving said rows of supports to and past said feeder and said pitting station and for actuating said feeder and pitter-actuating means between intermittent movements of said drupe supports by said conveyor moving means.

13. In apparatus as defined in claim 12;
  h. said feeder including a row of drupe-receiving supports respectively for single drupe halves, said row of drupe receiving supports being parallel with the rows of drupe supports on said conveyor and spaced above the receiving end of said conveyor, said drupe-receiving supports being connected for simultaneous actuation by said feeder-actuating means for discharging the halves received thereon onto a row of the drupe supports on said conveyor at said receiving end of the latter,
  i. a hopper adjacent to but spaced from said feeder for holding a bulk supply of said drupe halves for delivery to said feeder, and including delivery means extending below the bulk supply of drupe halves within said hopper to said feeder, said delivery means including a row of drupe carriers each extending to one of said drupe-receiving supports for engaging and conducting one of the drupe halves of said bulk supply to each of said drupe-receiving supports and for depositing each such drupe half on one of said drupe-receiving supports.

14. In apparatus as defined in claim 11;
  e. each of the drupe-receiving supports of said conveyor means being an upwardly opening cuplike member having imperforate walls for holding a quantity of water sufficient to substantially float a drupe half deposited therein with its convex side facing downwardly for automatically levelling the planar faces of said drupe halves, and
f. means adjacent to said receiving end of said conveyor for filling each cuplike member with said quantity of water,
g. means for simultaneously feeding a drupe half into each of the drupe supports of a row thereof at said receiving end of said conveyor with said convex side facing downwardly.

* * * * *